(12) United States Patent
Lyu et al.

(10) Patent No.: US 12,474,445 B2
(45) Date of Patent: Nov. 18, 2025

(54) DISTRIBUTED RADAR

(71) Applicant: HUAWEI TECHNOLOGIES CO., LTD., Guangdong (CN)

(72) Inventors: Rui Lyu, Chengdu (CN); Luqi Zhang, Shenzhen (CN); Yu Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 512 days.

(21) Appl. No.: 18/158,516

(22) Filed: Jan. 24, 2023

(65) Prior Publication Data
US 2023/0160999 A1 May 25, 2023

Related U.S. Application Data

(63) Continuation of application No. PCT/CN2021/107009, filed on Jul. 19, 2021.

(30) Foreign Application Priority Data

Jul. 28, 2020 (CN) .......................... 202010742331.8

(51) Int. Cl.
G01S 7/40 (2006.01)
G01S 13/00 (2006.01)

(52) U.S. Cl.
CPC .............. *G01S 7/4008* (2013.01); *G01S 7/40* (2013.01); *G01S 13/003* (2013.01)

(58) Field of Classification Search
CPC ......... G01S 7/4008; G01S 7/40; G01S 13/003
USPC ....................................................... 342/173
See application file for complete search history.

(56) References Cited

U.S. PATENT DOCUMENTS

| 3,842,417 A | * | 10/1974 | Williams | ............... H01Q 1/286 |
| | | | | 342/158 |
| 6,137,438 A | * | 10/2000 | McEwan | ................. G01S 13/16 |
| | | | | 342/134 |
| 9,971,028 B2 | * | 5/2018 | Park | ...................... G01S 13/345 |
| 10,379,210 B2 | * | 8/2019 | Jansen | ................. G01S 13/345 |
| 10,386,470 B2 | * | 8/2019 | Zivkovic | ............... G01S 13/931 |
| 11,057,862 B2 | * | 7/2021 | Scharf | ................... G01S 13/003 |

(Continued)

FOREIGN PATENT DOCUMENTS

| EP | 2527871 A1 | * | 11/2012 | ............ G01S 13/89 |
| EP | 3992668 A1 | * | 5/2022 | ........... G01S 13/343 |
| WO | 2006065172 A1 | | 6/2006 | |

OTHER PUBLICATIONS

Extended European Search Report issued in EP21851171.5, dated Sep. 29, 2023, 10 pages.

*Primary Examiner* — Nuzhat Pervin

(57) ABSTRACT

A distributed radar includes a control unit, a receive antenna, and N transmit antennas. The N transmit antennas include a first transmit antenna, a second transmit antenna, and a third transmit antenna. There are a first distance between the first transmit antenna and the second transmit antenna, and a second distance between the first transmit antenna and the third transmit antenna, and the first distance is shorter than the second distance. The second transmit antenna is connected to the control unit by using a first cable, the third transmit antenna is connected to the control unit by using a second cable, a ratio of the first distance to the second distance is a first ratio, a ratio of a length of the first cable to a length of the second cable is a second ratio, and the second ratio is greater than the first ratio.

20 Claims, 11 Drawing Sheets

(56) References Cited

U.S. PATENT DOCUMENTS

| | | | |
|---|---|---|---|
| 11,802,958 B2* | 10/2023 | Levitan | G01S 13/42 |
| 11,841,454 B2* | 12/2023 | Akamine | G01S 7/415 |
| 11,867,830 B2* | 1/2024 | Shahvirdi Dizaj Yekan | G01S 13/931 |
| 12,253,591 B2* | 3/2025 | Hong | G01S 13/723 |
| 2007/0085727 A1* | 4/2007 | Backes | G01S 7/038 342/198 |
| 2009/0012768 A1* | 1/2009 | Son | H01Q 3/30 703/13 |
| 2012/0146844 A1* | 6/2012 | Stirling-Gallacher | G01S 13/343 342/189 |
| 2014/0035774 A1* | 2/2014 | Khlifi | G01S 7/006 342/21 |
| 2018/0239013 A1* | 8/2018 | Lande | G01S 7/2927 |
| 2020/0271777 A1* | 8/2020 | Vacanti | H01Q 1/3233 |
| 2020/0319325 A1* | 10/2020 | Kong | G01S 7/4021 |
| 2021/0055382 A1* | 2/2021 | Kong | G01S 7/4052 |
| 2021/0247489 A1* | 8/2021 | Arage | G01S 13/04 |
| 2021/0293949 A1* | 9/2021 | Breddermann | G01S 13/931 |
| 2021/0311168 A1* | 10/2021 | Rafrafi | G01S 13/56 |
| 2021/0376464 A1* | 12/2021 | Rostomyan | H01Q 21/065 |
| 2022/0026526 A1* | 1/2022 | Maekawa | G01S 7/028 |
| 2023/0341499 A1* | 10/2023 | Chen | G01S 5/02 |
| 2024/0183942 A1* | 6/2024 | Nishimura | G01S 7/4056 |

* cited by examiner

DISTRIBUTED RADAR

CROSS-REFERENCE TO RELATED APPLICATIONS

This application is a continuation of International Application No. PCT/CN2021/107009, filed on Jul. 19, 2021, which claims priority to Chinese Patent Application No. 202010742331.8, filed on Jul. 28, 2020. The disclosures of the aforementioned applications are hereby incorporated by reference in their entireties.

TECHNICAL FIELD

The present disclosure relates to the field of radar antennas, and in particular, to a distributed radar.

BACKGROUND

With the increasing demand and level of automated driving, a vehicle-mounted millimeter-wave radar is required to provide higher range and angular resolutions when sensing a surrounding environment. A distributed multiple input multiple output (MIMO) radar operating in a submillimeter wave or terahertz band can meet this requirement well.

A plurality of antennas are distributed in the distributed MIMO radar, there is a specific spacing between the antennas, and an antenna far from a control unit needs to be connected to the control unit by using a cable. For different antennas, signals have additional transmission delays when transmitted in cables, besides different transmission delays in spatial paths. As a result, the antennas of the distributed MIMO radar cannot meet a time synchronization requirement.

SUMMARY

The present disclosure provides a distributed radar, which ensures accuracy of delay estimation, to meet a time synchronization requirement of each transmit antenna.

According to a first aspect, an embodiment of the present disclosure provides a distributed radar, including: a control unit, a receive antenna, and N transmit antennas. N is an integer greater than or equal to 3. The N transmit antennas include a first transmit antenna, a second transmit antenna, and a third transmit antenna, and a distance between the first transmit antenna and the control unit is less than a distance between another transmit antenna and the control unit. A distance between the first transmit antenna and the second transmit antenna is a first distance, a distance between the first transmit antenna and the third transmit antenna is a second distance, and the first distance is less than the second distance. The second transmit antenna is connected to the control unit by using a first cable, the third transmit antenna is connected to the control unit by using a second cable, a ratio of the first distance to the second distance is a first ratio, a ratio of a length of the first cable to a length of the second cable is a second ratio, and the second ratio is greater than the first ratio.

In this implementation, when synchronization estimation is performed by using a reflector, because the second ratio is greater than the first ratio, a transmission delay of a signal in a cable can be separated from a transmission delay of the signal in a spatial path in estimation, thereby ensuring accuracy of delay estimation, to meet a time synchronization requirement of each transmit antenna.

Optionally, in some possible implementations, the second ratio is greater than a product of the first ratio and 1.5, and the second ratio is less than a product of a reciprocal of the first ratio and 10. In this implementation, an optional value range of the ratio of the length of the first cable to the length of the second cable is provided, thereby further ensuring accuracy of delay estimation.

Optionally, in some possible implementations, the length of the first cable is greater than the length of the second cable.

Optionally, in some possible implementations, the N transmit antennas further include a fourth transmit antenna, a distance between the first transmit antenna and the fourth transmit antenna is a third distance, and the second distance is less than the third distance. The fourth transmit antenna is connected to the control unit by using a third cable, a ratio of the first distance to the third distance is a third ratio, a ratio of the length of the first cable to a length of the third cable is a fourth ratio, and the fourth ratio is greater than the third ratio. In this implementation, a quantity of far-end transmit antennas in the distributed radar may be more than 2, so that scalability of the solution is higher.

Optionally, in some possible implementations, the receive antenna, the first transmit antenna, and the control unit are integrated. This improves implementability of the solution.

Optionally, in some possible implementations, the first cable and the second cable are terahertz active cables (TAC). The distributed radar operating in a submillimeter wave or terahertz band may provide a higher angular resolution.

Optionally, in some possible implementations, the control unit is configured to:

first, control the first transmit antenna to transmit a first signal at a first frequency and a second signal at a second frequency, control the second transmit antenna to transmit a third signal at the first frequency and a fourth signal at the second frequency, and control the third transmit antenna to transmit a fifth signal at the first frequency and a sixth signal at the second frequency; then, receive, by using the receive antenna, an echo signal corresponding to each transmitted signal, which specifically includes a first echo signal of the first signal, a second echo signal of the second signal, a third echo signal of the third signal, a fourth echo signal of the fourth signal, a fifth echo signal of the fifth signal, and a sixth echo signal of the sixth signal; next, calculate a phase difference corresponding to a transmit/receive delay between each transmitted signal and each corresponding echo signal, which specifically includes a first phase difference corresponding to a transmit/receive delay between the first signal and the first echo signal, a second phase difference corresponding to a transmit/receive delay between the second signal and the second echo signal, a third phase difference corresponding to a transmit/receive delay between the third signal and the third echo signal, a fourth phase difference corresponding to a transmit/receive delay between the fourth signal and the fourth echo signal, a fifth phase difference corresponding to a transmit/receive delay between the fifth signal and the fifth echo signal, and a sixth phase difference corresponding to a transmit/receive delay between the sixth signal and the sixth echo signal; and further, calculate, based on an obtained phase difference set (including the first phase difference, the second phase difference, the third phase difference, the fourth phase difference, the fifth phase difference, and the sixth phase difference), a first delay of signal transmission through the first cable and a second delay of signal transmission through the second cable.

In this implementation, a specific implementation of delay estimation is provided, thereby improving practicality of the solution.

Optionally, in some possible implementations, the control unit includes a signal source, a signal separator, and a processor.

The signal source is configured to send the first signal, the second signal, the third signal, the fourth signal, the fifth signal, and the sixth signal to the signal separator and the processor.

The signal separator is configured to send the first signal and the second signal to the first transmit antenna, send the third signal and the fourth signal to the second transmit antenna, and send the fifth signal and the sixth signal to the third transmit antenna.

The processor is configured to obtain, from the receive antenna, an echo signal corresponding to each transmitted signal, which specifically includes the first echo signal, the second echo signal, the third echo signal, the fourth echo signal, the fifth echo signal, and the sixth echo signal; then, calculate the phase difference corresponding to the transmit/receive delay between each transmitted signal and each corresponding echo signal, which specifically includes the first phase difference, the second phase difference, the third phase difference, the fourth phase difference, the fifth phase difference, and the sixth phase difference; and further, calculate the first delay and the second delay based on the obtained phase difference set (including the first phase difference, the second phase difference, the third phase difference, the fourth phase difference, the fifth phase difference, and the sixth phase difference).

In this implementation, the implementation of delay estimation is described with reference to an internal structure of the control unit, thereby further improving implementability of the solution.

Optionally, in some possible implementations, the first cable and the second cable are TACs, and the control unit is further configured to:

first, control the first transmit antenna to transmit a seventh signal at a third frequency, control the second transmit antenna to transmit an eighth signal at the third frequency, and control the third transmit antenna to transmit a ninth signal at the third frequency; then, receive, by using the receive antenna, a seventh echo signal of the seventh signal, an eighth echo signal of the eighth signal, and a ninth echo signal of the ninth signal; and further, calculate a seventh phase difference corresponding to a transmit/receive delay between the seventh signal and the seventh echo signal, an eighth phase difference corresponding to a transmit/receive delay between the eighth signal and the eighth echo signal, and a ninth phase difference corresponding to a transmit/receive delay between the ninth signal and the ninth echo signal.

The control unit is further configured to:

calculate, based on the phase difference set, the seventh phase difference, the eighth phase difference, and the ninth phase difference, a first sweep slope variation of signal transmission through the first cable and a second sweep slope variation of signal transmission through the second cable.

In this implementation, a sweep slope variation calculation method is provided, and compensation may be performed for a change of a sweep slope of a radar signal based on a calculated sweep slope variation, thereby reducing impact of TAC dispersion on a radar signal frequency.

Optionally, in some possible implementations, the control unit is further configured to:

first, generate a first probing signal and a second probing signal; then, perform delay compensation on the first probing signal based on the first delay to obtain a first transmit moment, and perform delay compensation on the second probing signal based on the second delay to obtain a second transmit moment; and further, control the second transmit antenna to transmit the first probing signal at the first transmit moment, and control the third transmit antenna to transmit the second probing signal at the second transmit moment. It should be understood that the first probing signal and the second probing signal are signals transmitted by radar antennas in a formal operating state.

In this implementation, when formally operating, the radar may perform delay compensation on different far-end transmit antennas respectively based on a delay estimation result. Delay compensation may be specifically performed before probing signals are transmitted, to implement time synchronization of each transmit antenna.

Optionally, in some possible implementations, the control unit is further configured to:

first, control the second transmit antenna to transmit a first probing signal, and control the third transmit antenna to transmit a second probing signal; then, receive, by using the receive antenna, a first probing echo signal of the first probing signal and a second probing echo signal of the second probing signal; and further, perform delay compensation on the first probing echo signal based on the first delay, and perform delay compensation on the second probing echo signal based on the second delay. It should be understood that the first probing signal and the second probing signal are signals transmitted by radar antennas in a formal operating state.

In this implementation, another implementation of delay compensation is provided. Specifically, delay compensation may be performed after an echo signal of a probing signal is received, thereby improving flexibility of the solution.

Optionally, in some possible implementations, the signals transmitted by the transmit antennas are sine wave signals or narrowband amplitude modulation signals. It should be understood that, herein, it specifically means that test signals transmitted by the antenna for delay estimation are sine wave signals or narrowband amplitude modulation signals.

According to a second aspect, an embodiment of the present disclosure provides a distributed radar, including: a control unit, a transmit antenna, and N receive antennas. N is an integer greater than or equal to 3. The N receive antennas include a first receive antenna, a second receive antenna, and a third receive antenna, and a distance between the first receive antenna and the control unit is less than a distance between another receive antenna and the control unit. A distance between the first receive antenna and the second receive antenna is a first distance, a distance between the first receive antenna and the third receive antenna is a second distance, and the first distance is less than the second distance. The second receive antenna is connected to the control unit by using a first cable, the third receive antenna is connected to the control unit by using a second cable, a ratio of the first distance to the second distance is a first ratio, a ratio of a length of the first cable to a length of the second cable is a second ratio, and the second ratio is greater than the first ratio.

Optionally, in some possible implementations, the second ratio is greater than a product of the first ratio and 1.5, and the second ratio is less than a product of a reciprocal of the first ratio and 10.

Optionally, in some possible implementations, the length of the first cable is greater than the length of the second cable.

Optionally, in some possible implementations, the N receive antennas further include a fourth receive antenna, a distance between the first receive antenna and the fourth receive antenna is a third distance, and the second distance is less than the third distance. The fourth receive antenna is connected to the control unit by using a third cable, a ratio of the first distance to the third distance is a third ratio, a ratio of the length of the first cable to a length of the third cable is a fourth ratio, and the fourth ratio is greater than the third ratio.

Optionally, in some possible implementations, the transmit antenna, the first receive antenna, and the control unit are integrated.

Optionally, in some possible implementations, the first cable and the second cable are TACs.

Optionally, in some possible implementations, the control unit is configured to:
  first, control the transmit antenna to transmit a first signal at a first frequency and a second signal at a second frequency; then, receive, by using the first receive antenna, the second receive antenna, and the third receive antenna, an echo signal corresponding to each transmitted signal, which is specifically receiving a first echo signal of the first signal and a second echo signal of the second signal by using the first receive antenna, receiving a third echo signal of the first signal and a fourth echo signal of the second signal by using the second receive antenna, and receiving a fifth echo signal of the first signal and a sixth echo signal of the second signal by using the third receive antenna; next, calculate a phase difference corresponding to a transmit/receive delay between each transmitted signal and each corresponding echo signal, which specifically includes a first phase difference corresponding to a transmit/receive delay between the first signal and the first echo signal, a second phase difference corresponding to a transmit/receive delay between the second signal and the second echo signal, a third phase difference corresponding to a transmit/receive delay between the first signal and the third echo signal, a fourth phase difference corresponding to a transmit/receive delay between the second signal and the fourth echo signal, a fifth phase difference corresponding to a transmit/receive delay between the first signal and the fifth echo signal, and a sixth phase difference corresponding to a transmit/receive delay between the second signal and the sixth echo signal; and further, calculate, based on an obtained phase difference set (including the first phase difference, the second phase difference, the third phase difference, the fourth phase difference, the fifth phase difference, and the sixth phase difference), a first delay of signal transmission through the first cable and a second delay of signal transmission through the second cable.

Optionally, in some possible implementations, the control unit includes a signal source, a signal selector, and a processor.

The signal source is configured to send the first signal and the second signal to the transmit antenna and the processor.

The signal selector is configured to obtain, from the first receive antenna, the second receive antenna, and the third receive antenna, an echo signal corresponding to each transmitted signal, which is specifically obtaining the first echo signal and the second echo signal from the first receive antenna, obtaining the third echo signal and the fourth echo signal from the second receive antenna, and obtaining the fifth echo signal and the sixth echo signal from the third receive antenna; and then, send the first echo signal, the second echo signal, the third echo signal, the fourth echo signal, the fifth echo signal, and the sixth echo signal to the processor.

The processor is configured to calculate the phase difference corresponding to the transmit/receive delay between each transmitted signal and each corresponding echo signal, which specifically includes the first phase difference, the second phase difference, the third phase difference, the fourth phase difference, the fifth phase difference, and the sixth phase difference; and then, calculate the first delay and the second delay based on the obtained phase difference set (including the first phase difference, the second phase difference, the third phase difference, the fourth phase difference, the fifth phase difference, and the sixth phase difference).

Optionally, in some possible implementations, a cable connected between the control unit and each far-end receive antenna is a TAC, and the control unit is further configured to:
  first, control the transmit antenna to transmit a third signal at a third frequency; then, receive a seventh echo signal of the third signal by using the first receive antenna, receive an eighth echo signal of the third signal by using the second receive antenna, and receive a ninth echo signal of the third signal by using the third receive antenna; and further, calculate a seventh phase difference corresponding to a transmit/receive delay between the third signal and the seventh echo signal, an eighth phase difference corresponding to a transmit/receive delay between the third signal and the eighth echo signal, and a ninth phase difference corresponding to a transmit/receive delay between the third signal and the ninth echo signal.

The control unit is further configured to:
  calculate, based on the phase difference set, the seventh phase difference, the eighth phase difference, and the ninth phase difference, a first sweep slope variation of signal transmission through the first cable and a second sweep slope variation of signal transmission through the second cable.

Optionally, in some possible implementations, the control unit is further configured to: first, control the transmit antenna to transmit a probing signal; then, receive a first probing echo signal of the probing signal by using the second receive antenna, and receive a second probing echo signal of the probing signal by using the third receive antenna; and further, perform delay compensation on the first probing echo signal based on the first delay, and perform delay compensation on the second probing echo signal based on the second delay. It should be understood that the first probing signal and the second probing signal are signals transmitted by radar antennas in a formal operating state.

Optionally, in some possible implementations, the signals transmitted by the transmit antenna are sine wave signals or narrowband amplitude modulation signals. It should be understood that, herein, it specifically means that test signals transmitted by the antenna for delay estimation are sine wave signals or narrowband amplitude modulation signals.

According to a third aspect, the present disclosure provides a distributed radar, including: a control unit, a receive antenna, a first transmit antenna, and a second transmit antenna. A distance between the first transmit antenna and the control unit is less than a distance between the second transmit antenna and the control unit, the second transmit antenna is connected to the control unit by using a cable, and the control unit includes a signal source, a signal separator, and a processor.

The signal source is configured to transmit a first signal at a first frequency, a second signal at a second frequency, a third signal at the first frequency, and a fourth signal at the second frequency to the signal separator.

The signal separator is configured to send the first signal and the second signal to the first transmit antenna, and send the third signal and the fourth signal to the second transmit antenna.

The processor is configured to obtain a first echo signal of the first signal, a second echo signal of the second signal, a third echo signal of the third signal, and a fourth echo signal of the fourth signal from the receive antenna: calculate a first phase difference corresponding to a transmit/receive delay between the first signal and the first echo signal, a second phase difference corresponding to a transmit/receive delay between the second signal and the second echo signal, a third phase difference corresponding to a transmit/receive delay between the third signal and the third echo signal, and a fourth phase difference corresponding to a transmit/receive delay between the fourth signal and the fourth echo signal; and calculate, based on the first phase difference, the second phase difference, the third phase difference, and the fourth phase difference, a delay of signal transmission through the cable.

Optionally, in some possible implementations, the control unit is configured to:

control the first transmit antenna to transmit the first signal at the first frequency and the second signal at the second frequency, and control the second transmit antenna to transmit the third signal at the first frequency and the fourth signal at the second frequency: receive the first echo signal of the first signal, the second echo signal of the second signal, the third echo signal of the third signal, and the fourth echo signal of the fourth signal by using the receive antenna; calculate the first phase difference corresponding to the transmit/receive delay between the first signal and the first echo signal, the second phase difference corresponding to the transmit/receive delay between the second signal and the second echo signal, the third phase difference corresponding to the transmit/receive delay between the third signal and the third echo signal, and the fourth phase difference corresponding to the transmit/receive delay between the fourth signal and the fourth echo signal; and calculate, based on the first phase difference, the second phase difference, the third phase difference, and the fourth phase difference, the delay of signal transmission through the cable.

Optionally, in some possible implementations, the cable is a TAC, and the control unit is further configured to:

control the first transmit antenna to transmit a fifth signal at a third frequency, and control the second transmit antenna to transmit a sixth signal at the third frequency: receive a fifth probing echo signal of the fifth signal and a sixth probing echo signal of the sixth signal by using the receive antenna; and calculate a fifth phase difference corresponding to a transmit/receive delay between the fifth signal and the fifth echo signal and a sixth phase difference corresponding to a transmit/receive delay between the sixth signal and the sixth echo signal.

The control unit is further configured to:

calculate, based on the first phase difference, the second phase difference, the third phase difference, the fourth phase difference, the fifth phase difference, and the sixth phase difference, a sweep slope variation of signal transmission through the cable.

Optionally, in some possible implementations, the receive antenna, the first transmit antenna, and the control unit are integrated.

In the embodiments of the present disclosure, transmit antennas of the distributed radar include a near-end transmit antenna close to a position of the control unit, and a far-end transmit antenna connected to the control unit by using a cable. A ratio of distances between the near-end transmit antenna and any two far-end transmit antennas is a first ratio, a ratio of lengths of cables for connecting to the two transmit antennas is a second ratio, and the second ratio is greater than the first ratio. It should be understood that, when synchronization estimation is performed by using a reflector, because the second ratio is greater than the first ratio, a transmission delay of a signal in a cable can be separated from a transmission delay of the signal in a spatial path in estimation, thereby ensuring accuracy of delay estimation, to meet a time synchronization requirement of each transmit antenna.

DESCRIPTION OF EMBODIMENTS

Embodiments of the present disclosure provide a distributed radar, so that a transmission delay of a signal in a cable can be separated from a transmission delay of the signal in a spatial path in estimation, thereby ensuring accuracy of delay estimation, to meet a time synchronization requirement of each transmit antenna. In this specification, the claims, and the accompanying drawings of the present disclosure, terms "first", "second", "third", "fourth", and the like (if existent) are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. In addition, terms such as "include", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

The distributed radar provided in the present disclosure refers to a radar in which a plurality of transmit antennas or receive antennas are distributed in space and each antenna is controlled by a control unit. The distributed radar may be applied to a plurality of fields such as automobile driving assistance, atmospheric probing, and telemetry and remote sensing. The following uses a distributed radar applied to a vehicle-mounted scenario as an example for further description.

Figure 1:
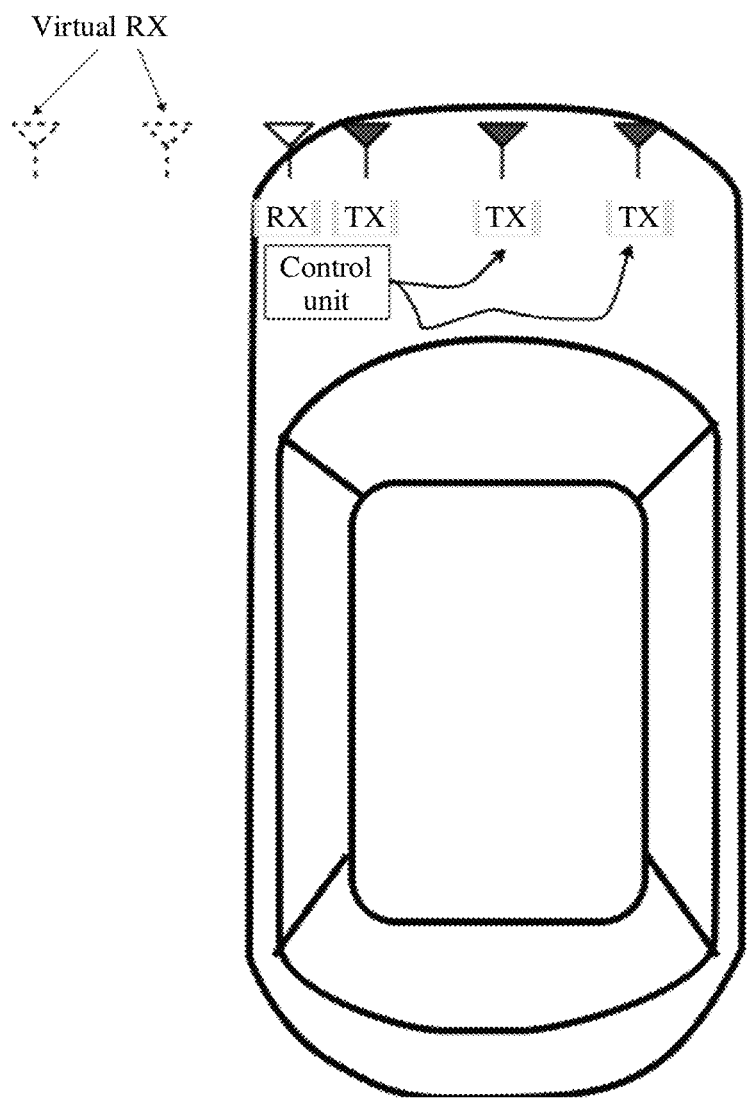
FIG. 1 is a schematic diagram of a vehicle-mounted distributed radar.

FIG. 1 is a schematic diagram of a vehicle-mounted distributed radar. For the distributed radar, a plurality of radar antennas (including a transmit antenna and a receive antenna) may be mounted on a vehicle body dispersedly, and an extremely high angular resolution may be implemented by using a virtual aperture synthesis technology, to avoid a problem that a radar size is limited by a single mounting position in the vehicle-mounted scenario. In addition, the distributed radar may operate in a submillimeter wave or terahertz band, so that a narrower beam can be generated with a same aperture, and the distributed radar can provide a higher angular resolution when sensing a surrounding environment.

As shown in FIG. 1, the distributed radar has a plurality of remote transmit antennas (TX), which are connected to a control unit by using cables. Two virtual receive antennas (RX) are virtual receive antennas constructed from data of two remote transmit antennas when a virtual aperture is constructed by using a multiple input multiple output (MIMO) radar technology.

Because the remote radar antennas are connected to the control unit by using the cables, for different radar antennas, signals have additional transmission delays when transmitted in cables, besides different transmission delays in spatial paths. As a result, the antennas in the distributed radar cannot meet a time synchronization requirement.

Therefore, to achieve time synchronization of the distributed radar, it is necessary to accurately estimate a transmission delay of a signal transmitted by each radar antenna. To this end, the present disclosure provides a distributed radar to ensure accuracy of delay estimation, which is described in detail below.

It should be noted that, for ease of description, in the following, a transmit antenna that is in the distributed radar and that is connected to a control unit by using a cable is referred to as a far-end transmit antenna, and a transmit antenna with a distance to the control unit being less than a distance between each far-end transmit antenna and the control unit is referred to as a near-end transmit antenna.

Figure 2:
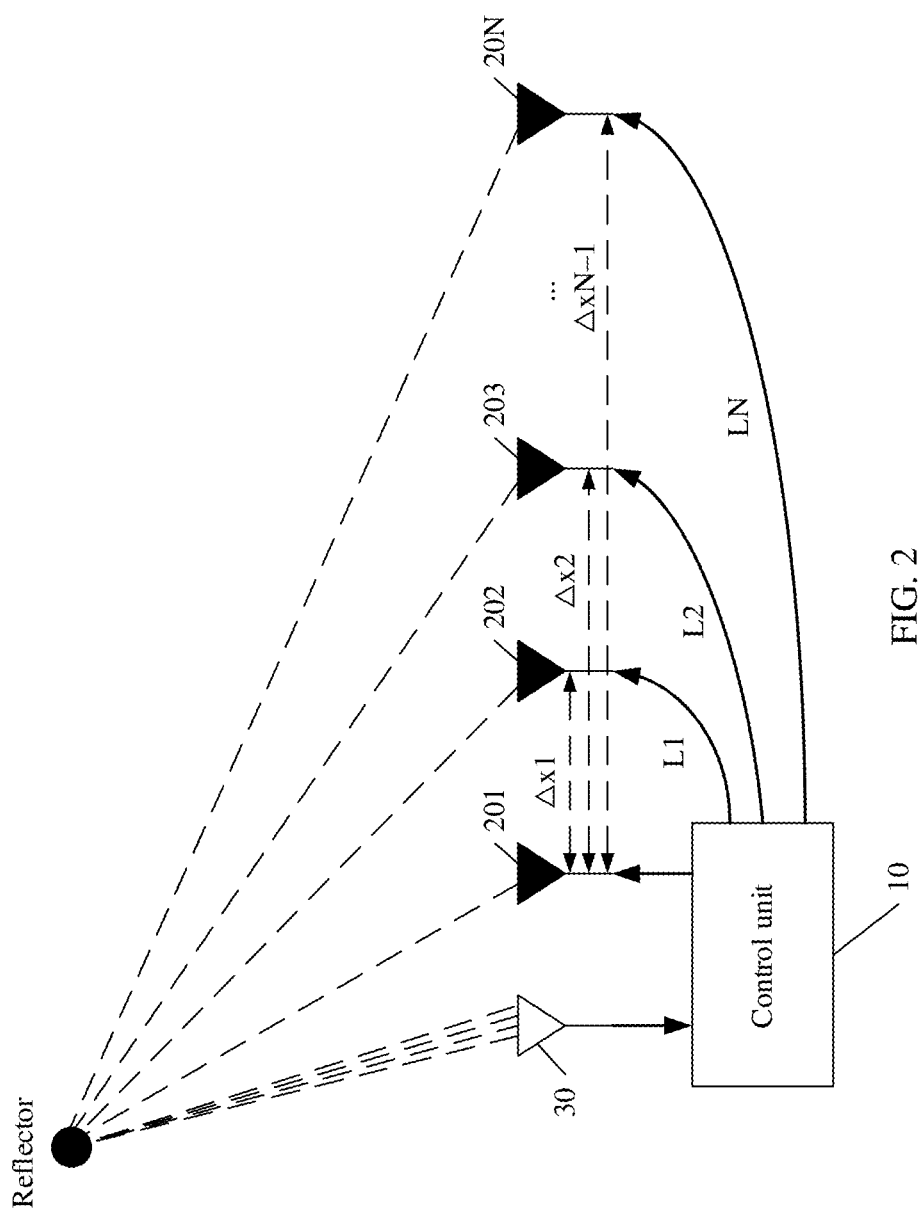
FIG. 2 is a schematic diagram of a structure of a first distributed radar according to the present disclosure.

FIG. 2 is a schematic diagram of a structure of a first distributed radar according to the present disclosure. The distributed radar includes: a control unit 10, a receive antenna 30, and N transmit antennas 201 to 20N. N is an integer greater than or equal to 3. The N transmit antennas have different positions in space, and the N transmit antennas include a near-end transmit antenna 201 and a plurality of far-end transmit antennas 202 to 20N. It may be understood that the near-end transmit antenna 201 is disposed at a position close to the control unit 10, that is, a distance between the near-end transmit antenna 201 and the control unit 10 is less than a distance between each far-end transmit antenna and the control unit 10. Specifically, the near-end transmit antenna 201 may be integrated with the control unit 10. The receive antenna 30 may be integrated with the control unit 10, or may be connected to the control unit 10 by using a cable. This is not limited herein. The plurality of far-end transmit antennas 202 to 20N are respectively connected to the control unit 10 by using corresponding cables. For example, the far-end transmit antenna 202 is connected to the control unit 10 by using a cable L1, and the far-end transmit antenna 203 is connected to the control unit 10 by using a cable L2. A spatial distance between the near-end transmit antenna 201 and the far-end transmit antenna 202 is denoted by $\Delta x1$, a spatial distance between the near-end transmit antenna 201 and the far-end transmit antenna 203 is denoted by $\Delta x2$, and by analogy, a spatial distance between the near-end transmit antenna 201 and the far-end transmit antenna 20N is denoted as $\Delta xN-1$.

It should be understood that, in this embodiment, a quantity of receive antennas 30 is not limited to one, and a plurality of receive antennas may be distributed in space. A specific quantity is not limited herein. In addition, the receive antenna 30 as well as each transmit antenna may be a structure of a single antenna, or may be a structure of an antenna array. This is not specifically limited herein.

It should be noted that, an echo signal obtained after a signal transmitted by each transmit antenna is reflected by a reflector is received by the receive antenna. Because different transmit antennas have different positions in space and are connected to the control unit by using cables of different lengths, transmit/receive delays of signals transmitted by different transmit antennas include transmission delays in cables and transmission delays in spatial paths. During delay estimation, if a ratio of distances between the near-end transmit antenna and different far-end transmit antennas is the same as a ratio of cable lengths corresponding to the far-end transmit antennas (for example, L1/L2=$\Delta x1/\Delta x2$), a transmission delay in a cable cannot be separated from a transmission delay in a spatial path mathematically, resulting in a relatively large estimation error. Therefore, in the present disclosure, cable lengths corresponding to any two far-end transmit antennas need to meet the following condition: L1 and L2 are used as an example. On the premise that L1<L2, L1/L2>$\Delta x1/\Delta x2$ needs to be met. In a possible implementation, to further ensure accuracy of delay estimation, $1.5*\Delta x1/\Delta x2 < L1/L2 < 10*\Delta x2/\Delta x1$. In another possible implementation, when a condition number of a matrix $$E = \begin{bmatrix} \Delta x1 & \Delta x2 \\ L1 & L2 \end{bmatrix}$$

is minimum, an error of delay estimation is minimum, and a value of L1/L2 is optimal. For example, if $\Delta x2/\Delta x1=2$, and a length of L2 is close to $\Delta x2$, an optimal value of L1/L2 is approximately 2.

Figure 3:
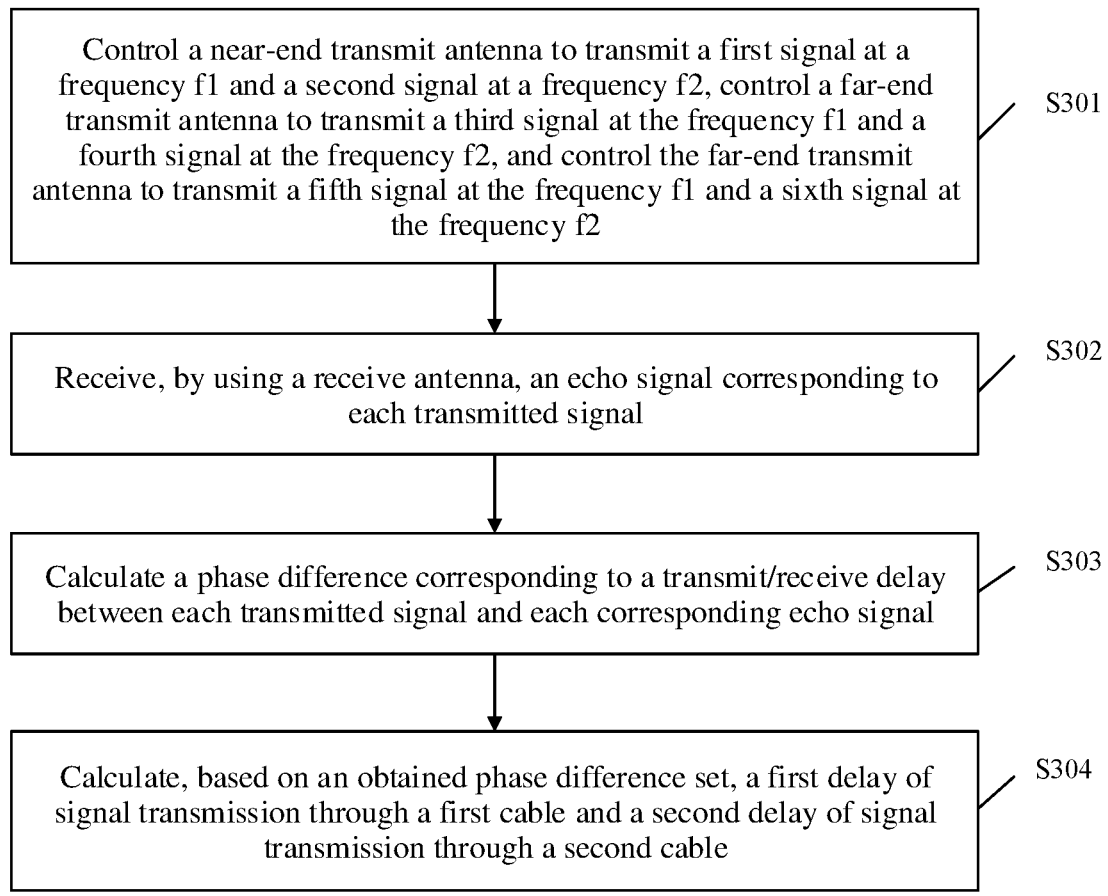
FIG. 3 is a schematic diagram of a delay estimation method according to the present disclosure.

The following describes, with reference to the distributed radar shown in FIG. 2, a delay estimation manner provided in the present disclosure. Specifically, an example in which the N transmit antennas include a near-end transmit antenna 201, a far-end transmit antenna 202, and a far-end transmit antenna 203 is used for description. FIG. 3 is a schematic diagram of a delay estimation method according to the present disclosure. The delay estimation method is performed by the control unit 10, and specifically includes the following steps.

S301. Control the near-end transmit antenna to transmit a first signal at a frequency f1 and a second signal at a frequency f2, control the far-end transmit antenna to transmit a third signal at the frequency f1 and a fourth signal at the frequency f2, and control the far-end transmit antenna to transmit a fifth signal at the frequency f1 and a sixth signal at the frequency f2.

It may be understood that the near-end transmit antenna 201, the far-end transmit antenna 202, and the far-end transmit antenna 203 transmit signals at the frequency f1 and the frequency f2 in a time division manner. In addition, the control unit 10 may first control one of the transmit antennas to transmit signals at the frequency f1 and the frequency f2, and then control another transmit antenna to transmit signals at the frequency f1 and the frequency f2. A specific transmit sequence is not limited herein.

S302. Receive, by using the receive antenna, an echo signal corresponding to each transmitted signal.

Specifically, the echo signal includes a first echo signal of the first signal, a second echo signal of the second signal, a third echo signal of the third signal, a fourth echo signal of the fourth signal, a fifth echo signal of the fifth signal, and a sixth echo signal of the sixth signal.

S303. Calculate a phase difference corresponding to a transmit/receive delay between each transmitted signal and each corresponding echo signal.

Specifically, the phase difference includes a first phase difference, a second phase difference, a third phase difference, a fourth phase difference, a fifth phase difference, and a sixth phase difference. The first phase difference is a phase difference corresponding to a transmit/receive delay between the first signal and the first echo signal. The second phase difference is a phase difference corresponding to a transmit/receive delay between the second signal and the second echo signal. The third phase difference is a phase difference corresponding to a transmit/receive delay between the third signal and the third echo signal. The fourth phase difference is a phase difference corresponding to a transmit/receive delay between the fourth signal and the fourth echo signal. The fifth phase difference is a phase difference corresponding to a transmit/receive delay between the fifth signal and the fifth echo signal. The sixth phase difference is a phase difference corresponding to a transmit/receive delay between the sixth signal and the sixth echo signal.

Optionally, the present disclosure provides a plurality of manners of calculating a phase difference corresponding to a transmit/receive delay, which are separately described below.

First, the phase difference is calculated through period counting and phase detection.

Figure 4:
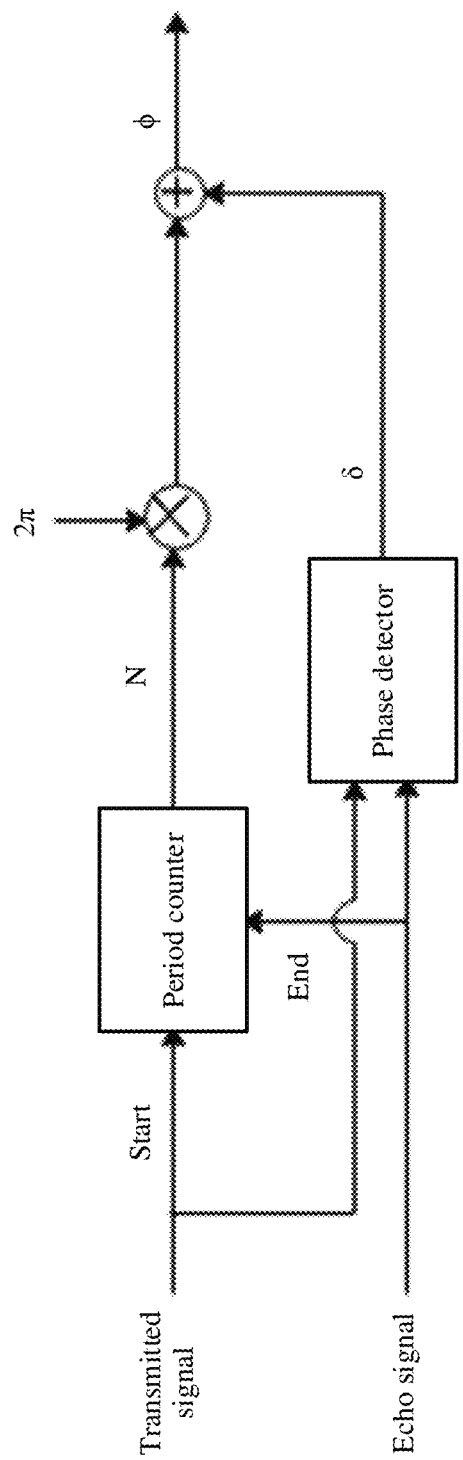
FIG. 4 is a schematic diagram of a first embodiment of calculating a phase difference corresponding to a transmit/receive delay according to the present disclosure.
Figure 5:
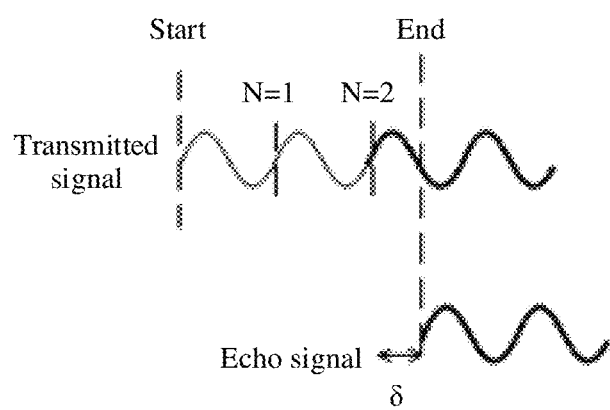
FIG. 5 is a schematic diagram of a waveform of a first transmitted signal according to the present disclosure.

FIG. 4 is a schematic diagram of a first embodiment of calculating a phase difference corresponding to a transmit/receive delay according to the present disclosure. It may be understood that a processor in the control unit 10 includes a structure of a period counter and a phase detector shown in FIG. 4. FIG. 5 is a schematic diagram of a waveform of a first transmitted signal according to the present disclosure. A signal transmitted by a transmit antenna is a sine wave signal, whose waveform may be shown in FIG. 5. Specifically, when the antenna transmits the signal, a period counter detects the transmitted signal and starts counting, and the counter is incremented by 1 for each waveform period. After detecting an echo signal, the period counter stops counting and outputs a count value N. In addition, the transmitted signal and the echo signal are simultaneously input to a phase detector for phase detection, and the phase detector compares waveforms of the received and transmitted signals in a same period of time, and outputs a phase difference δ between the two. Finally, a phase difference φ corresponding to a transmit/receive delay is calculated based on the output of the period counter and the output of the phase detector. For example, if a start moment of the echo signal lags behind that of the transmitted signal by N complete sinusoidal periods, and a continuous wave phase of the echo signal lags behind a continuous wave phase of the transmitted signal by δ, the phase difference corresponding to the transmit/receive delay is $\varphi=2\pi N+\delta$.

Second, the phase difference is calculated through envelope detection and phase detection.

Figure 6:
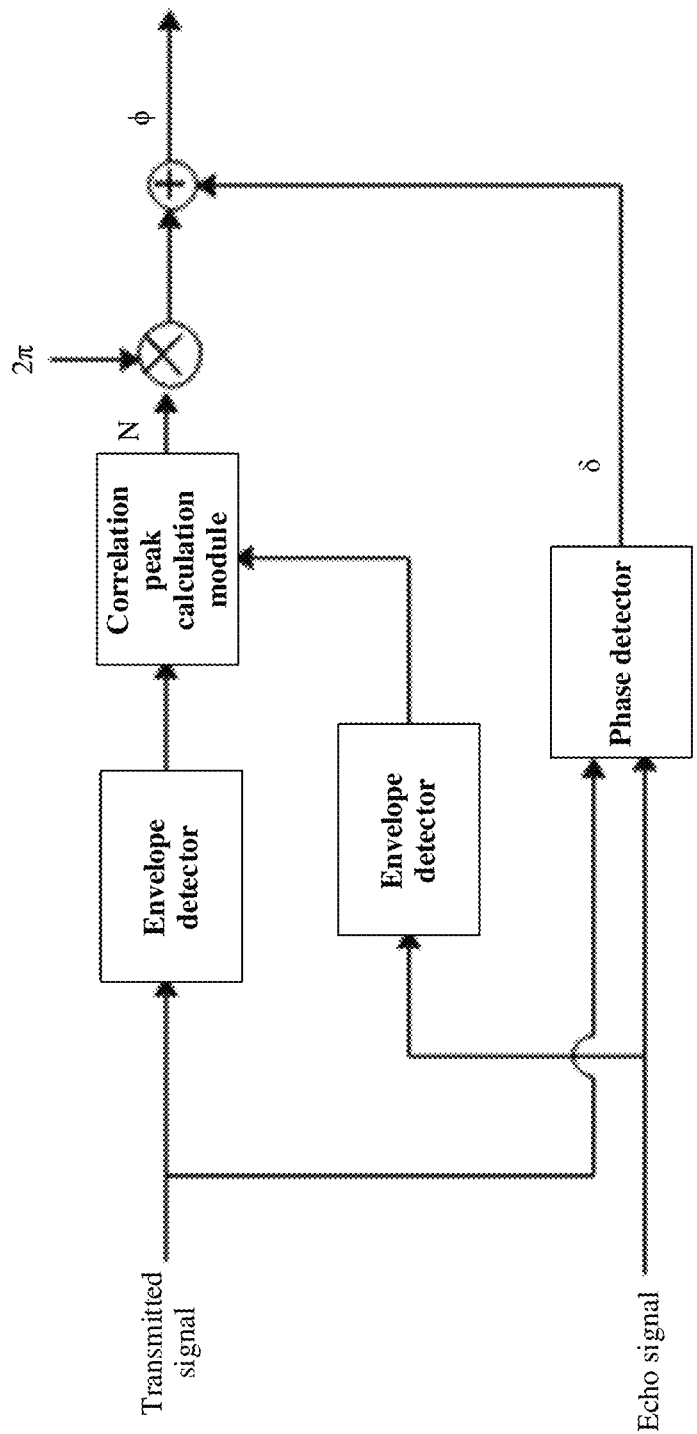
FIG. 6 is a schematic diagram of a second embodiment of calculating a phase difference corresponding to a transmit/receive delay according to the present disclosure.
Figure 7:
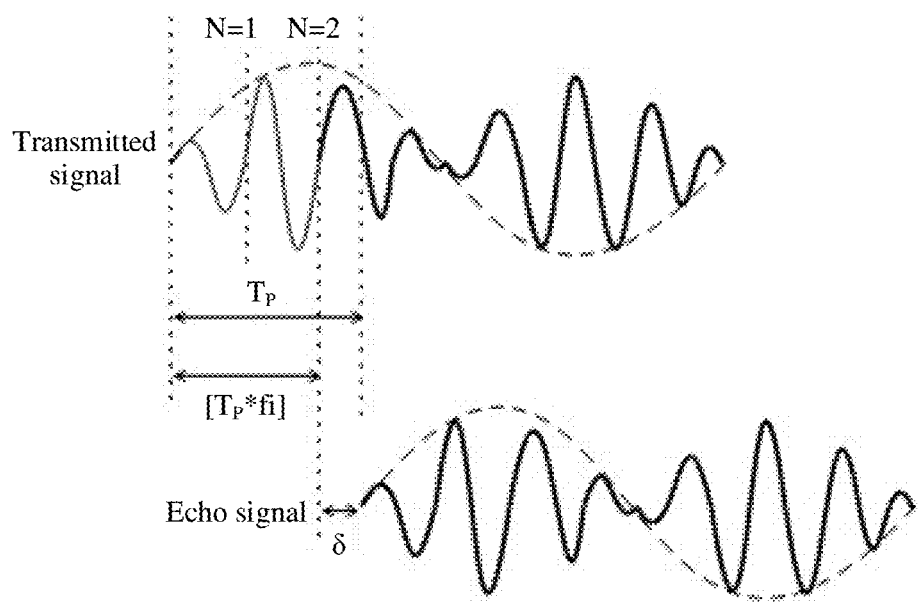
FIG. 7 is a schematic diagram of a waveform of a second transmitted signal according to the present disclosure.

FIG. 6 is a schematic diagram of a second embodiment of calculating a phase difference corresponding to a transmit/receive delay according to the present disclosure. It may be understood that a processor in the control unit 10 includes a structure of an envelope detector, a correlation peak calculation module, and a phase detector shown in FIG. 6. FIG. 7 is a schematic diagram of a waveform of a second transmitted signal according to the present disclosure. A signal transmitted by a transmit antenna is a narrowband amplitude modulation signal, whose waveform may be shown in FIG. 7. The narrowband amplitude modulation signal may be represented as $s(t)=A(t)\cos(2\pi f_i t)=\sin(2\pi f_0 t)\cos(2\pi f_i t)$. A center frequency of the narrowband amplitude modulation signal is $f_i$, and A(t) is a fixed low-frequency modulation signal. For example, in this embodiment, A(t) is a sine wave signal at a frequency of 1 MHZ, that is, $f_0=1$ MHz. Specifically, the transmitted signal and an echo signal each have a slowly varying envelope, as shown by dashed lines on waveforms in FIG. 7. One envelope detector performs envelope detection on the transmitted signal, another envelope detector performs envelope detection on the echo signal, and the two envelope detectors respectively output low-frequency envelope signals $\sin(2\pi f_0 t)$ corresponding to the transmitted signal and the echo signal. Then, a correlation peak calculation module respectively calculates time domain correlation values of the two low-frequency envelope signals, and determines a time deviation $T_P$ between which correlation peaks occur. Refer to $T_P$ shown in FIG. 7. Then, it is determined based on $T_P$ that a quantity of delay periods of a carrier signal $f_i$ is $N=T_P*f_i$. A phase detector calculates a phase difference δ between the transmitted signal and the echo signal on a carrier frequency signal $\cos(2\pi f_i t)$. Finally, a phase difference corresponding to a transmit/receive delay is calculated as $\varphi=2\pi N+\delta$.

S304. Calculate, based on an obtained phase difference set, a first delay of signal transmission through the first cable and a second delay of signal transmission through the second cable.

The phase difference set includes the first phase difference, the second phase difference, the third phase difference, the fourth phase difference, the fifth phase difference, and the sixth phase difference.

Specifically, the first phase difference and the second phase difference may be represented as $$\phi_{t1fi} = \frac{R}{v_c}\omega_i, \; i = 1 \text{ or } 2.$$

t1 represents the near-end transmit antenna 201. $\phi_{t1f1}$ represents the first phase difference, and $\phi_{t1f2}$ represents the second phase difference. $v_c$ is a velocity at which an electromagnetic wave is transmitted in free space. $\omega_i$ represents an angular velocity corresponding to a signal at a frequency fi. A phase difference corresponding to a transmit/receive delay of the near-end transmit antenna 201 is mainly generated by transmission delays of electromagnetic wave signals at different frequencies in space.

The third phase difference and the fourth phase difference may be represented as $$\phi_{t2fi} = \frac{R}{v_c}\omega_i + \frac{\Delta x_1 d}{v_c}\omega_i + \frac{L_1}{v_\omega}\omega_i, \; i = 1 \text{ or } 2.$$

t2 represents the far-end transmit antenna 202. $\phi_{t2f1}$ represents the third phase difference, and $\phi_{t2f2}$ represents the fourth phase difference. d is an unknown quantity determined by azimuth angles of a reflector relative to the near-end transmit antenna 201 and the far-end transmit antenna 202, and reflects an electromagnetic wave path length difference corresponding to the spacing $\Delta x1$ between the near-end transmit antenna 201 and the far-end transmit antenna 202. $v_\omega$ represents a propagation velocity of an electromagnetic wave in a cable. If there is no dispersion effect in the cable, electromagnetic waves at different frequencies have a same propagation velocity. Other parameters have been described above, and are not described herein again.

$$\frac{\Delta x_1 d}{v_c}\omega_i$$

represents a signal phase difference generated due to the electromagnetic wave path length difference between the near-end transmit antenna 201 and the far-end transmit antenna 202.

$$\frac{L_1}{v_\omega}\omega_i$$

represents a signal phase difference generated when an electromagnetic wave is transmitted through the L1 cable.

The fifth phase difference and the sixth phase difference may be represented as $$\phi_{t3fi} = \frac{R}{v_c}\omega_i + \frac{\Delta x_2 d}{v_c}\omega_i + \frac{L_2}{v_\omega}\omega_i, \; i = 1 \text{ or } 2.$$

t3 represents the far-end transmit antenna 203. $\phi_{t3f1}$ represents the fifth phase difference, and $\phi_{t3f2}$ represents the sixth phase difference. Other parameters have been described above, and are not described herein again.

$$\frac{\Delta x_2 d}{v_c}\omega_i$$

represents a signal phase difference generated due to an electromagnetic wave path length difference between the near-end transmit antenna 201 and the far-end transmit antenna 203.

$$\frac{L_2}{v_\omega}\omega_i$$

represents a signal phase difference generated when an electromagnetic wave is transmitted through the L2 cable.

After the six phase differences are obtained, a difference between phase differences corresponding to each transmit antenna at the two frequencies is further calculated. Details are as follows:

$$\theta_{t1d21} = \phi_{t1f2} - \phi_{t1f1} = \frac{R}{v_c}(\omega_2 - \omega_1) = \frac{R}{v_c}\Delta\omega$$

$$\theta_{t2d21} = \phi_{t2f2} - \phi_{t2f1} = \frac{R}{v_c}\Delta\omega + \frac{\Delta x_1 d}{v_c}\Delta\omega + \frac{L_1}{v_\omega}\Delta\omega$$

$$\theta_{t3d21} = \phi_{t3f2} - \phi_{t3f1} = \frac{R}{v_c}\Delta\omega + \frac{\Delta x_2 d}{v_c}\Delta\omega + \frac{L_2}{v_\omega}\Delta\omega$$

$\theta_{t1d21}$ represents a difference between the second phase difference and the first phase difference that correspond to the near-end transmit antenna 201. $\theta_{t2d21}$ represents a difference between the fourth phase difference and the third phase difference that correspond to the far-end transmit antenna 202. $\theta_{t3d21}$ represents a difference between the sixth phase difference and the fifth phase difference that correspond to the far-end transmit antenna 203. $\Delta\omega$ represents an angular frequency difference between a signal at the frequency f2 and a signal at the frequency f1. Because $\Delta\omega$ is known, two values N1 and N2 may be obtained after mathematical transformation is performed on the three differences between the phase differences, which are specifically expressed as follows:

$$N_1 = \frac{(\theta_{t2d21} - \theta_{t1d21})}{\Delta\omega} = \frac{\Delta x_1 d}{v_c} + \frac{L_1}{v_\omega} = \Delta x_1 M_1 + M_2$$

$$N_2 = \frac{(\theta_{t3d21} - \theta_{t1d21})}{\Delta\omega} = \frac{\Delta x_2 d}{v_c} + \frac{L_2}{v_\omega} = \Delta x_2 M_1 + \alpha M_2$$

$$M_1 = \frac{d}{v_c}, M_2 = \frac{L_1}{v_\omega}, \text{ and } \alpha = \frac{L_2}{L_1}.$$

Because a position of the reflector cannot be probed before the radar formally operates, d is an unknown quantity, and $M_1$ is also an unknown quantity. $M_2$ represents a transmission delay of an electromagnetic wave signal at the frequency f1 in the cable whose length is L1. Because a cable length and a transmission velocity of the electromagnetic wave in the cable are unknown, $M_2$ is also an unknown quantity. $\alpha$ is a ratio of cable lengths L1 and L2. Therefore, a transmission delay of an electromagnetic wave signal at the frequency f1 in the cable whose length is L2 may be represented by $\alpha M_2$.

It may be understood that, in a normal case, $M_1$ and $M_2$ may be calculated based on the expressions corresponding to N1 and N2. However, it can be learned from observation that if $$\alpha = \frac{L_2}{L_1} = \frac{\Delta x_2}{\Delta x_1},$$

that is, the cable lengths corresponding to the two far-end transmit antennas are exactly proportional to the distances between the near-end transmit antenna and the two far-end transmit antennas, the expressions corresponding to N1 and N2 degenerate into a pair of linear correlation equations. In this case, $M_1$ and $M_2$ cannot be calculated in this way. Therefore, to ensure accuracy of estimation, the ratio of L1 to L2 needs to meet the range given in the embodiment shown in FIG. 2.

It should be noted that, after the delay estimation described in the embodiment shown in FIG. 3 is completed, when formally operating, the radar may perform delay compensation on different far-end transmit antennas respectively based on a delay estimation result. There may be a plurality of specific implementations, which are separately described below.

First, delay compensation is performed before a radar probing signal is sent.

Specifically, generation parameters of signals transmitted by the far-end transmit antenna 202 and the far-end transmit antenna 203 are modified. For example, the far-end transmit antenna 202 generates a radar probing signal $M_2$ earlier than a default generation time. The far-end transmit antenna 203 generates a radar probing signal $\alpha M_2$ earlier than the default generation time.

Second, delay compensation is performed after an echo signal of a radar probing signal is received.

Specifically, the far-end transmit antenna 202 and the far-end transmit antenna 203 generate probing signals based on default generation parameters and transmit the probing signals. After receiving an echo signal of the signal transmitted by the far-end transmit antenna 202, the control unit subtracts $M_2$ from a receive moment of the echo signal. After receiving an echo signal of the signal transmitted by the far-end transmit antenna 203, the control unit subtracts $\alpha M_2$ from a receive moment of the echo signal.

Figure 8:
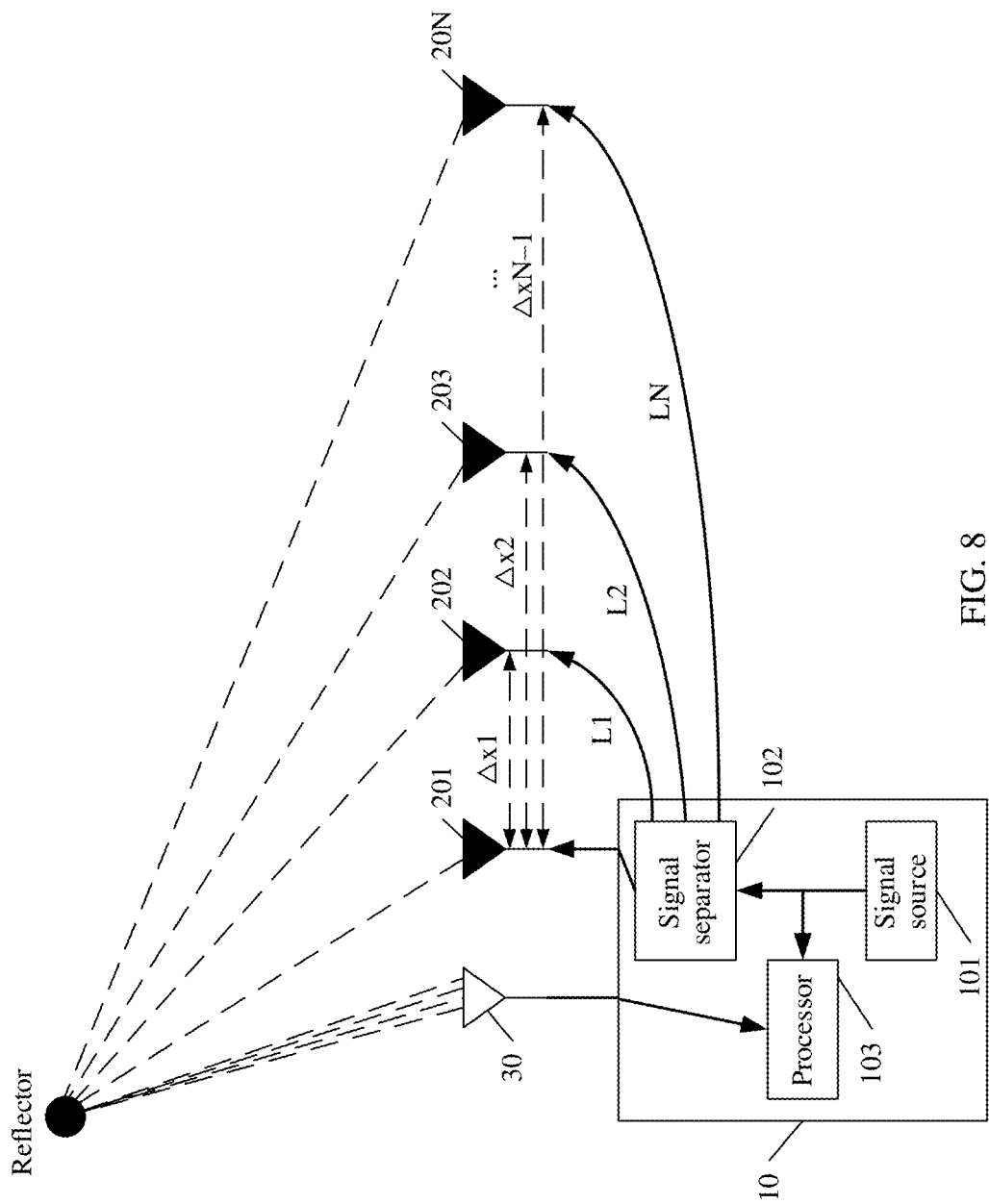
FIG. 8 is a schematic diagram of a structure of a second distributed radar according to the present disclosure.

The following further describes, with reference to an internal structure of the control unit 10, the delay estimation method provided in the present disclosure. FIG. 8 is a schematic diagram of a structure of a second distributed radar according to the present disclosure. The control unit 10 includes a signal source 101, a signal separator 102, and a processor 103. The signal source 101 is configured to generate signals at specified frequencies (for example, the first signal to the sixth signal), and send the generated signals to the signal separator 102 and the processor 103. The signal separator 102 is configured to send the signals generated by the signal source to different transmit antennas, for example, send the first signal and the second signal to the near-end transmit antenna 201, send the third signal and the fourth signal to the first far-end transmit antenna 202, and send the fifth signal and the sixth signal to the second far-end transmit antenna 203. The processor 103 is configured to: obtain, from the receive antenna 30, an echo signal (such as the first echo signal to the sixth echo signal) of a signal transmitted by each transmit antenna; then, calculate a phase difference (such as the first phase difference to the sixth phase difference) based on each transmitted signal and the echo signal corresponding to the transmitted signal; and further, calculate, based on the first phase difference to the sixth phase difference, the first delay of signal transmission through the first cable and the second delay of signal transmission through the second cable. It should be noted that, in addition to the signal source 101 configured to transmit a test signal, the control unit 10 may further include an operating signal source specifically configured to transmit an operating signal. The processor 103 may perform, based on a delay estimation result, delay compensation on the operating signal transmitted by the operating signal source. Certainly, optionally, both the test signal and the operating signal may alternatively be sent by a same signal source (the signal source 101 shown in FIG. 8). This is not specifically limited herein.

It can be learned from the foregoing description that, transmit antennas of the distributed radar include a near-end transmit antenna close to a position of the control unit, and a far-end transmit antenna connected to the control unit by using a cable. Cable lengths corresponding to any two far-end transmit antennas meet a condition $L1/L2 > \Delta x1/\Delta x2$, so that a transmission delay of a signal in a cable can be separated from a transmission delay of the signal in a spatial path in estimation, thereby ensuring accuracy of delay estimation, to meet a time synchronization requirement of each transmit antenna.

In a possible implementation, the distributed radar operating in a submillimeter wave or terahertz band may provide a higher angular resolution. Because a terahertz signal may be directly transmitted in a plastic waveguide made of a polymer, the distributed radar may be connected to a remote transmit antenna by using a terahertz active cable (TAC). However, when the terahertz radar signal is transmitted on the remote cable, not only an additional transmission delay is caused, but also a dispersion characteristic of the TAC changes a sweep slope of a linear frequency modulation (LFM) radar signal.

Figure 9:
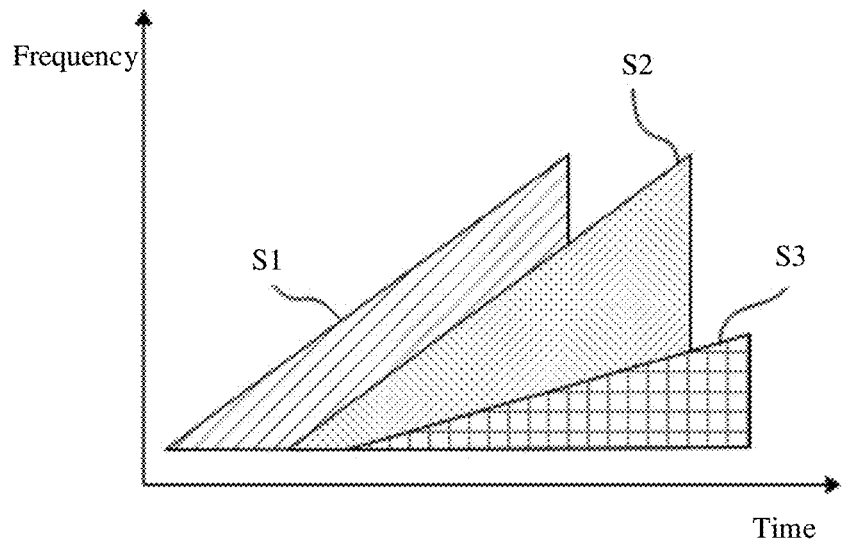
FIG. 9 is a schematic diagram of impact of TAC dispersion on a radar signal frequency.

FIG. 9 is a schematic diagram of impact of TAC dispersion on a radar signal frequency. A time-frequency change of a normally generated LFM radar signal is shown by S1 in FIG. 9. In a case without a dispersion effect, a signal received by the radar after reflection by a target object is shown by S2 in FIG. 9. S1 and S2 have exactly a same sweep slope in a time-frequency domain, that is, the two have a fixed frequency difference in a time overlapping region. However, after the radar signal is affected by dispersion, the received signal is distorted, as shown by S3 in FIG. 9. In this case, a sweep slope of S3 changes, S1 and S3 do not have a same sweep slope in the time-frequency domain, and the radar cannot stably detect physical information of the target object (such as, a velocity, an acceleration, and a distance of the target object). Therefore, in an implementation in which the TAC is used as a cable to connect to a far-end transmit antenna, in addition to a transmit/receive delay, a sweep slope variation needs to be calculated. Details are described below.

Based on the embodiment shown in FIG. 3, the control unit 10 further controls the near-end transmit antenna 201 to transmit a seventh signal at a frequency f3, control the first far-end transmit antenna 202 to transmit an eighth signal at the frequency f3, and control the second far-end transmit antenna 203 to transmit a ninth signal at the frequency f3. The control unit 10 further receives, by using the receive antenna 30, a seventh echo signal of the seventh signal, an eighth echo signal of the eighth signal, and a ninth echo signal of the ninth signal. The control unit 10 further calculates a seventh phase difference corresponding to a transmit/receive delay between the seventh signal and the seventh echo signal, an eighth phase difference corresponding to a transmit/receive delay between the eighth signal and the eighth echo signal, and a ninth phase difference corresponding to a transmit/receive delay between the ninth signal and the ninth echo signal. Further, the control unit 10 calculates, based on the first phase difference to the ninth phase difference, a first delay and a first sweep slope variation of signal transmission through the first cable and a second delay and a second sweep slope variation of signal transmission through the second cable. This calculation process is further described below.

The first phase difference, the second phase difference, and the seventh phase difference may be represented as $$\phi_{t1fi} = \frac{R}{v_c}\omega_i.\ i = 1, 2, \text{ or } 3.$$

$\phi_{t1f1}$ represents the first phase difference, $\phi_{t1f2}$ represents the second phase difference, and $\phi_{t1f3}$ represents the seventh phase difference. Parameters in the expression have been described above, and are not described herein again.

The third phase difference, the fourth phase difference, and the eighth phase difference may be represented as $$\phi_{t2fi} = \frac{R}{v_c}\omega_i + \frac{\Delta x_1 d}{v_c}\omega_i + \frac{L_1}{v_{\omega_i}}\omega_i.\ i = 1, 2, \text{ or } 3.$$

$\phi_{t2f1}$ represents the third phase difference, $\phi_{t2f2}$ represents the fourth phase difference, and $\phi_{t2f3}$ represents the eighth phase difference. $v_{\omega_i}$ represents a velocity at which an electromagnetic wave at a frequency fi is propagated in a TAC medium. Due to a dispersion effect in the TAC, electromagnetic waves at different frequencies have different propagation velocities in the TAC medium. For example, a relationship between propagation velocities of electromagnetic waves at the frequencies f1 and f2 in the TAC medium is $$\frac{1}{v_{\omega_2}} = \frac{1}{v_{\omega_1}} + \beta(\omega_2 - \omega_1).$$

Other parameters in the expression have been described above, and are not described herein again.

The fifth phase difference, the sixth phase difference, and the ninth phase difference may be represented as $$\phi_{t3fi} = \frac{R}{v_c}\omega_i + \frac{\Delta x_2 d}{v_c}\omega_i + \frac{L_2}{v_{\omega_i}}\omega_i.\ i = 1, 2, \text{ or } 3.$$

$\phi_{t3f1}$ represents the fifth phase difference, $\phi_{t3f2}$ represents the sixth phase difference, and $\phi_{t3f3}$ represents the ninth phase difference. Parameters in the expression have been described above, and are not described herein again.

After the nine phase differences are obtained, differences between phase differences corresponding to each transmit antenna at the three frequencies are further calculated. Details are as follows:

$$\theta_{t1di1} = \phi_{t1fi} - \phi_{t1f1} = \frac{R}{v_c}(\omega_2 - \omega_1) = \frac{R}{v_c}\Delta\omega_i,\ i = 2 \text{ or } 3$$

$$\theta_{t2di1} = \phi_{t2fi} - \phi_{t2f1} = \frac{R}{v_c}\Delta\omega_i + \frac{\Delta x_1 d}{v_c}\Delta\omega_i + \frac{L_1}{v_{\omega_1}}\Delta\omega_i + L_1\beta\Delta\omega_i\omega_i,\ i = 2 \text{ or } 3$$

$$\theta_{t3di1} = \phi_{t3fi} - \phi_{t3f1} = \frac{R}{v_c}\Delta\omega_i + \frac{\Delta x_2 d}{v_c}\Delta\omega_i + \frac{L_2}{v_{\omega_1}}\Delta\omega_i + L_2\beta\Delta\omega_i\omega_i,\ i = 2 \text{ or } 3$$

$\theta_{t1di1}$ represents a difference between the second phase difference and the first phase difference or between the seventh phase difference and the first phase difference that correspond to the near-end transmit antenna 201. $\theta_{t2di1}$ represents a difference between the fourth phase difference and the third phase difference or between the eighth phase difference and the third phase difference that correspond to the far-end transmit antenna 202. $\theta_{t3di1}$ represents a difference between the sixth phase difference and the fifth phase difference or between the ninth phase difference and the fifth phase difference that correspond to the far-end transmit antenna 203. Because $\Delta\omega 2$ and $\Delta\omega 3$ are known, four values N1, N2, N3, and N4 may be obtained after mathematical transformation is performed on the six differences between the phase differences, which are specifically expressed as follows:

$$N_1 = \frac{(\theta_{t2d21} - \theta_{t1d21})}{\Delta\omega_2} = \frac{\Delta x_1 d}{v_c} + \frac{L_1}{v_{\omega_1}} + L_1\beta\Delta\omega_2 = \Delta x_1 M_1 + M_2 + M_3\omega_2$$

$$N_2 = \frac{(\theta_{t3d21} - \theta_{t1d21})}{\Delta\omega_2} = \frac{\Delta x_2 d}{v_c} + \frac{L_2}{v_{\omega_1}} + L_2\beta\Delta\omega_2 = \Delta x_2 M_1 + \alpha M_2 + \alpha M_3\omega_2$$

$$N_3 = \frac{(\theta_{t2d31} - \theta_{t1d31})}{\Delta\omega_3} = \frac{\Delta x_1 d}{v_c} + \frac{L_1}{v_{\omega_1}} + L_1\beta\Delta\omega_3 = \Delta x_1 M_1 + M_2 + M_3\omega_3$$

$$N_4 = \frac{(\theta_{t3d31} - \theta_{t1d31})}{\Delta\omega_3} = \frac{\Delta x_2 d}{v_c} + \frac{L_2}{v_{\omega_1}} + L_2\beta\Delta\omega_3 = \Delta x_2 M_1 + \alpha M_2 + \alpha M_3\omega_3$$

$$M_1 = \frac{d}{v_c},\ M_2 = \frac{L_1}{v_\omega},\ M_3 = L_1\beta,\ \text{and } \alpha = \frac{L_2}{L_1}.$$

Because a position of the reflector cannot be probed before the radar formally operates, d is an unknown quantity, and $M_1$ is also an unknown quantity. $M_2$ represents a transmission delay of an electromagnetic wave signal at the frequency f1 in the TAC cable whose length is L1. Because a TAC cable length and a transmission velocity of the electromagnetic wave in the TAC cable are unknown, $M_2$ is also an unknown quantity. $M_3$ represents a dispersion degree in the TAC cable whose length is L1, that is, $M_3$ directly determines a sweep slope variation after an LFM signal is transmitted through the TAC cable whose length is L1. $\alpha$ is a ratio of the cable lengths L1 and L2. Therefore, a transmission delay of an electromagnetic wave signal at the frequency f1 in the cable whose length is L2 may be represented by $\alpha M_2$. A sweep slope variation after an LFM signal is transmitted through the TAC cable whose length is L2 is $\alpha M_3$. It should be noted that, to ensure accuracy of estimation, a ratio of L1 to L2 needs to meet the range given in the embodiment shown in FIG. 2. In this way, $M_1$, $M_2$, $M_3$, and $\alpha$ may be calculated based on the four expressions of N1 to N4.

It can be learned from the foregoing description that, according to the sweep slope variation calculation method provided in the present disclosure, compensation may be performed for a change of a sweep slope of a radar signal, thereby reducing impact of TAC dispersion on a radar signal frequency.

It should be noted that, the delay estimation method and the sweep slope variation estimation method are described above by using an example in which the N transmit antennas include the near-end transmit antenna 201, the far-end transmit antenna 202, and the far-end transmit antenna 203. On this basis, delay estimation and sweep slope variation estimation of more far-end transmit antennas may be implemented by referring to the foregoing calculation manner, and details are not described herein.

In addition, the delay estimation method and the sweep slope variation estimation method that are provided above are not only applicable to the distributed radar structure shown in FIG. 2, and if transmit antennas of a distributed radar include a near-end transmit antenna and only one far-end transmit antenna, the foregoing method can also be used for delay estimation and sweep slope variation estimation of this structure, which is further described below.

Figure 10:
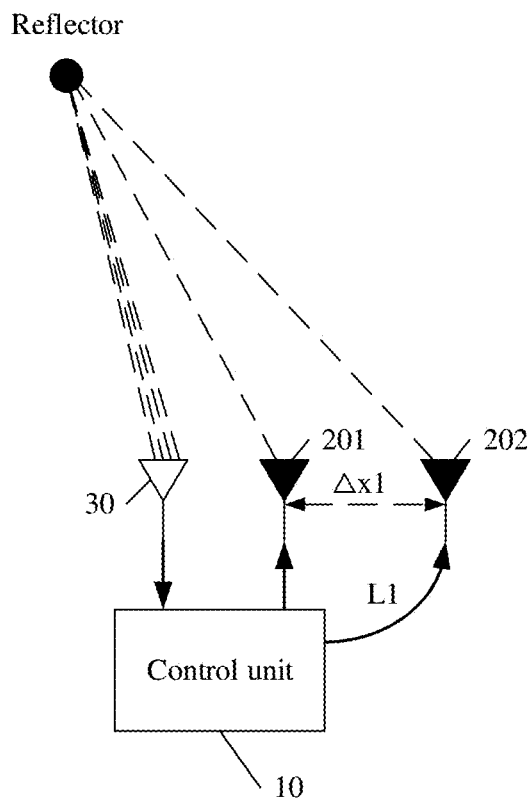
FIG. 10 is a schematic diagram of a structure of a third distributed radar according to the present disclosure.

FIG. 10 is a schematic diagram of a structure of a third distributed radar according to the present disclosure. Similar to the manner provided above, a near-end transmit antenna 201 and a far-end transmit antenna 202 each need to transmit a signal at a frequency f1, a signal at a frequency f2, and a signal at a frequency f3 respectively. Then, three phase differences corresponding to the near-end transmit antenna 201 and three phase differences corresponding to the far-end transmit antenna 202 are calculated. The three phase differences corresponding to the near-end transmit antenna 201 may be represented as $$\phi_{t1fi} = \frac{R}{v_c}\omega_i. \ i = 1, 2, \text{ or } 3.$$

The three phase differences corresponding to the far-end transmit antenna 202 may be represented as $$\phi_{t2fi} = \frac{R}{v_c}\omega_i + \frac{\Delta x_1 d}{v_c}\omega_i + \frac{L_1}{v_{\omega_i}}\omega_i. \ i = 1, 2, \text{ or } 3.$$

Further, for the near-end transmit antenna 201 and the far-end transmit antenna 202, differences between a phase difference corresponding to the signal at the frequency f1 and phase differences corresponding to the signal at the frequency f2 and the signal at the frequency f3 are calculated respectively. Details are as follows:

$$\theta_{t1di1} = \phi_{t1fi} - \phi_{t1f1} = \frac{R}{v_c}(\omega_2 - \omega_1) = \frac{R}{v_c}\Delta\omega_i, \ i = 2 \text{ or } 3$$

$$\theta_{t2di1} = \phi_{t2fi} - \phi_{t2f1} = \frac{R}{v_c}\Delta\omega_i + \frac{\Delta x_1 d}{v_c}\Delta\omega_i + \frac{L_1}{v_{\omega_1}}\Delta\omega_i + L_1\beta\Delta\omega_i\omega_i, \ i = 2 \text{ or } 3$$

Because $\Delta\omega 2$ and $\Delta\omega 3$ are known, two values N1 and N2 may be obtained after mathematical transformation is performed on the four differences between the phase differences, which are specifically expressed as follows:

$$N_1 = \frac{(\theta_{t2d21} - \theta_{t1d21})}{\Delta\omega_2} = \frac{\Delta x_1 d}{v_c} + \frac{L_1}{v_{\omega_1}} + L_1\beta\Delta\omega_2 = \Delta x_1 M_1 + M_2 + M_3\omega_2$$

$$N_2 = \frac{(\theta_{t2d31} - \theta_{t1d31})}{\Delta\omega_3} = \frac{\Delta x_1 d}{v_c} + \frac{L_1}{v_{\omega_1}} + L_1\beta\Delta\omega_2 = \Delta x_1 M_1 + M_2 + M_3\omega_3$$

$$M_1 = \frac{d}{v_c}, M_2 = \frac{L_1}{v_{\omega_1}}, M_3 = L_1\beta,$$

and it is assumed that $P=\Delta x_1 M_1 + M_2$. In this way, $M_3$ and P may be calculated based on the expressions of N1 and N2. It should be understood that, $M_3$ represents a dispersion degree in the TAC cable whose length is L1, that is, $M_3$ directly determines a sweep slope variation after an LFM signal is transmitted through the TAC cable whose length is L1. P represents a transmission delay of a signal transmitted by the far-end transmit antenna relative to a signal transmitted by the near-end transmit antenna. $M_2$ represents a transmission delay of an electromagnetic wave signal at the frequency f1 in the TAC cable whose length is L1. $\Delta x_1 M_1$ represents a transmission delay difference corresponding to a spacing $\Delta x1$ between the near-end transmit antenna and the far-end transmit antenna. Further, delay compensation may be performed based on P on a signal transmitted by the far-end transmit antenna, and sweep slope compensation may be performed based on $M_3$ on a signal transmitted by the far-end transmit antenna.

The foregoing embodiments are described based on a "single input multiple output" distributed radar structure shown in FIG. 2. In addition, the present disclosure may also be applied to a "multiple input single output" distributed radar structure. Details are described below.

It should be noted that, for ease of description, in the following, a receive antenna that is in a distributed radar and that is connected to a control unit by using a cable is referred to as a far-end receive antenna, and a receive antenna whose distance to the control unit is less than a distance between each far-end receive antenna and the control unit is referred to as a near-end receive antenna.

Figure 11:
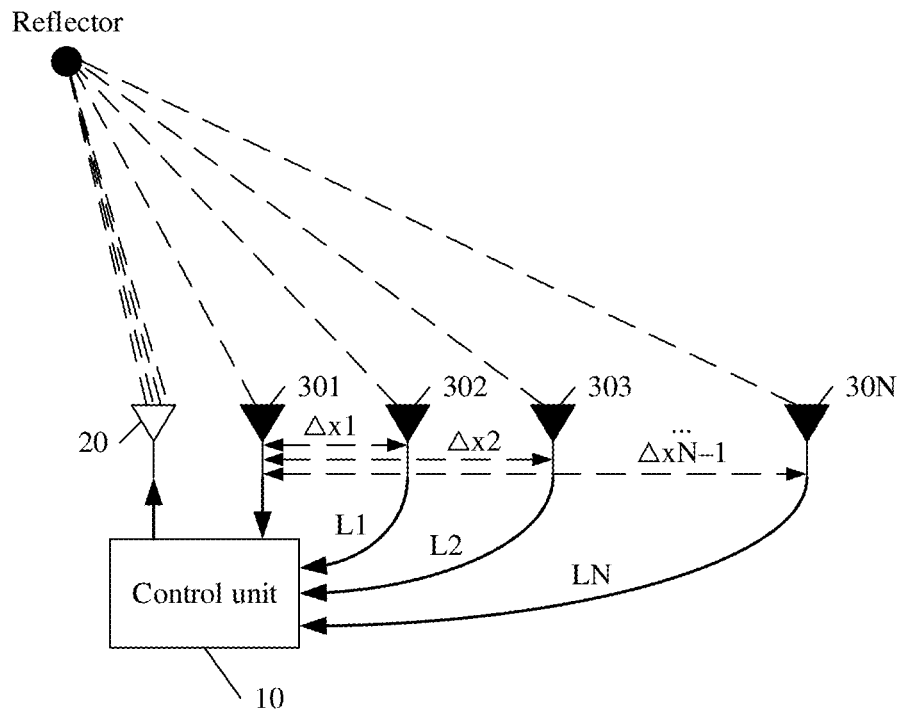
FIG. 11 is a schematic diagram of a structure of a fourth distributed radar according to the present disclosure.

FIG. 11 is a schematic diagram of a structure of a fourth distributed radar according to the present disclosure. The distributed radar includes: a control unit 10, a transmit antenna 20, and N receive antennas 301 to 30N. N is an integer greater than or equal to 3. The N receive antennas have different positions in space, and the N receive antennas include a near-end receive antenna 301 and a plurality of far-end receive antennas 302 to 30N. It may be understood that the near-end receive antenna 301 is disposed at a position close to the control unit 10, that is, a distance between the near-end receive antenna 301 and the control unit 10 is less than a distance between each far-end receive antenna and the control unit 10. Specifically, the near-end receive antenna 301 may be integrated with the control unit 10. The transmit antenna 20 may be integrated with the control unit 10, or may be connected to the control unit 10 by using a cable. This is not limited herein. The plurality of far-end receive antennas 302 to 30N are respectively connected to the control unit 10 by using corresponding cables. For example, the far-end receive antenna 302 is connected to the control unit 10 by using a cable L1, and the far-end receive antenna 303 is connected to the control unit 10 by using a cable L2. A spatial distance between the near-end receive antenna 301 and the far-end receive antenna 302 is denoted by $\Delta x1$, a spatial distance between the near-end receive antenna 301 and the far-end receive antenna 303 is denoted by $\Delta x2$, and by analogy, a spatial distance between the near-end receive antenna 301 and the far-end receive antenna 30N is denoted as $\Delta xN-1$.

It should be noted that, similar to the description of the embodiment shown in FIG. 2, cable lengths corresponding to any two far-end receive antennas need to meet the following condition: L1 and L2 are used as an example. On the premise that L1<L2, L1/L2>$\Delta x1/\Delta x2$ needs to be met. In a possible implementation, to further ensure accuracy of delay estimation, $1.5*\Delta x1/\Delta x2 < L1/L2 < 10*\Delta x2/\Delta x1$. In another possible implementation, when a condition number of a matrix $$E = \begin{bmatrix} \Delta x1 & \Delta x2 \\ L1 & L2 \end{bmatrix}$$

is minimum, an error of delay estimation is minimum, and a value of L1/L2 is optimal. For example, if $\Delta x2/\Delta x1=2$, and a length of L2 is close to $\Delta x2$, an optimal value of L1/L2 is approximately 2.

It should be understood that, in this embodiment, a quantity of transmit antennas 20 is not limited to one, and a plurality of transmit antennas may be distributed in space. A specific quantity is not limited herein.

Figure 12:
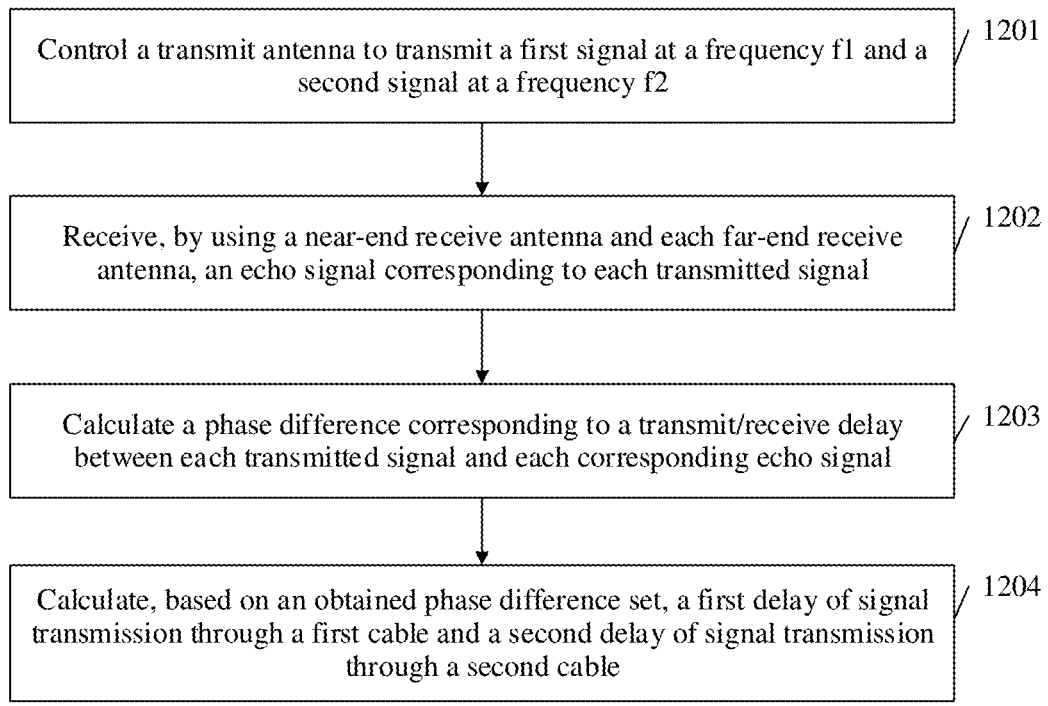
FIG. 12 is a schematic diagram of a delay estimation method according to the present disclosure.

The following describes, with reference to the distributed radar shown in FIG. 11, a delay estimation manner provided in the present disclosure. Specifically, an example in which the N receive antennas include a near-end receive antenna 301, a far-end receive antenna 302, and a far-end receive antenna 303 is used for description. FIG. 12 is a schematic diagram of a delay estimation method according to the present disclosure. The delay estimation method is performed by the control unit 10, and specifically includes the following steps.

1201. Control the transmit antenna to transmit a first signal at a frequency f1 and a second signal at a frequency f2.

1202. Receive, by using the near-end receive antenna and each far-end receive antenna, an echo signal corresponding to each transmitted signal.

Specifically, a first echo signal of the first signal and a second echo signal of the second signal are received by using the near-end receive antenna 301, a third echo signal of the first signal and a fourth echo signal of the second signal are received by using the far-end receive antenna 302, and a fifth echo signal of the first signal and a sixth echo signal of the second signal are received by using the far-end receive antenna 303.

1203. Calculate a phase difference corresponding to a transmit/receive delay between each transmitted signal and each corresponding echo signal.

Specifically, the phase difference includes a first phase difference, a second phase difference, a third phase difference, a fourth phase difference, a fifth phase difference, and a sixth phase difference.

The first phase difference is a phase difference corresponding to a transmit/receive delay between the first signal and the first echo signal. The second phase difference is a phase difference corresponding to a transmit/receive delay between the second signal and the second echo signal. The third phase difference is a phase difference corresponding to a transmit/receive delay between the first signal and the third echo signal. The fourth phase difference is a phase difference corresponding to a transmit/receive delay between the second signal and the fourth echo signal. The fifth phase difference is a phase difference corresponding to a transmit/receive delay between the first signal and the fifth echo signal. The sixth phase difference is a phase difference corresponding to a transmit/receive delay between the second signal and the sixth echo signal.

It should be noted that the foregoing phase difference calculation manner is similar to the manner described in step S303 in the embodiment shown in FIG. 3, and details are not described herein again.

1204. Calculate, based on an obtained phase difference set, a first delay of signal transmission through the first cable and a second delay of signal transmission through the second cable.

The phase difference set includes the first phase difference, the second phase difference, the third phase difference, the fourth phase difference, the fifth phase difference, and the sixth phase difference.

In this embodiment, the foregoing manner of calculating the first delay and the second delay is similar to the manner described in step 304 in the embodiment shown in FIG. 3, and details are not described herein again.

Figure 13:
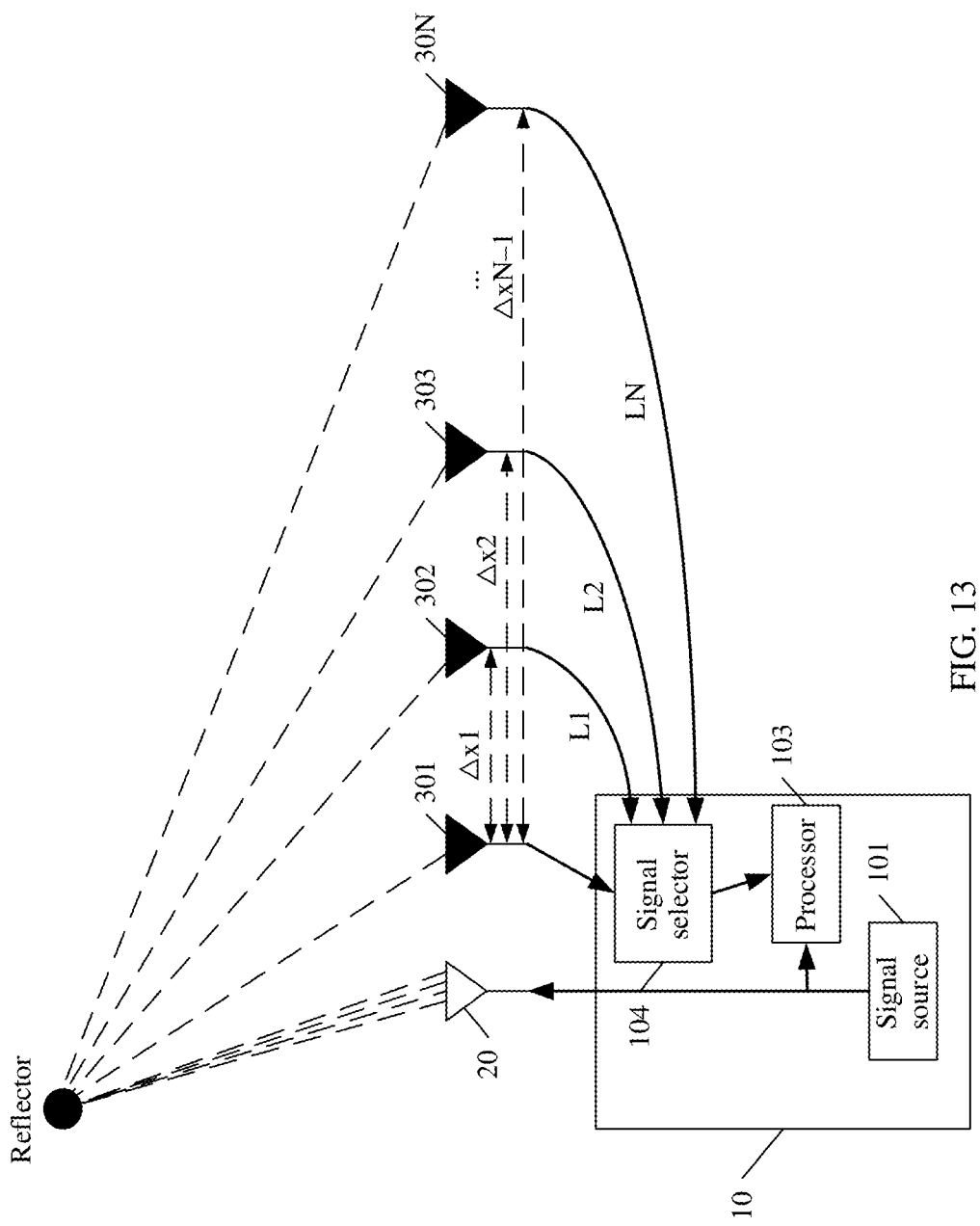
FIG. 13 is a schematic diagram of a structure of a fifth distributed radar according to the present disclosure.

The following further describes, with reference to an internal structure of the control unit 10, the delay estimation method provided in the present disclosure. FIG. 13 is a schematic diagram of a structure of a fifth distributed radar according to the present disclosure. The control unit 10 includes a signal source 101, a signal selector 104, and a processor 103. The signal source 101 is configured to generate signals at specified frequencies (for example, the first signal and the second signal), and send the generated signals to the transmit antenna 20 and the processor 103. The receive antennas are respectively configured to receive echo signals (such as the first echo signal to the sixth echo signal) of the first signal and the second signal. The signal selector 104 is configured to obtain corresponding echo signals from the receive antennas, and send the echo signals to the processor 103 in a time division or parallel manner. For example, the signal selector 104 may send the first echo signal to the sixth echo signal to the processor 103 one by one, or the signal selector 104 may send some or all echo signals to the processor 103 at a time. The processor 103 is configured to calculate a phase difference (such as the first phase difference to the sixth phase difference) based on each transmitted signal and an echo signal corresponding to the transmitted signal; and further, calculate, based on the first phase difference to the sixth phase difference, the first delay of signal transmission through the first cable and the second delay of signal transmission through the second cable. It should be noted that, in addition to the signal source 101 configured to transmit a test signal, the control unit 10 may further include an operating signal source specifically configured to transmit an operating signal. The processor 103 may perform, based on a delay estimation result, delay compensation on the operating signal transmitted by the operating signal source. Certainly, optionally, both the test signal and the operating signal may alternatively be sent by a same signal source (the signal source 101 shown in FIG. 12). This is not specifically limited herein.

It may be understood that, in an implementation in which the TAC is used as a cable to connect to a far-end receive antenna, in addition to a transmit/receive delay, a sweep slope variation needs to be calculated. Details are described below.

Based on the embodiment shown in FIG. 12, the control unit 10 further controls the transmit antenna 20 to transmit a third signal at a frequency f3. The control unit 10 further receives a seventh echo signal of the third signal by using the near-end receive antenna 301, receives an eighth echo signal of the third signal by using the first far-end receive antenna 302, and receives a ninth echo signal of the third signal by using the second far-end receive antenna 303. The control unit 10 further calculates a seventh phase difference corresponding to a transmit/receive delay between the third signal and the seventh echo signal, an eighth phase difference corresponding to a transmit/receive delay between the third signal and the eighth echo signal, and a ninth phase difference corresponding to a transmit/receive delay between the third signal and the ninth echo signal. Further, the control unit 10 calculates, based on the first phase difference to the ninth phase difference, a first delay and a first sweep slope variation of signal transmission through the first cable and a second delay and a second sweep slope variation of signal transmission through the second cable. A specific calculation manner is similar to the related description in the embodiment shown in FIG. 2, and details are not described herein again.

It should be noted that, the foregoing embodiments are merely used to describe the technical solutions of the present disclosure, but are not intended to limit the technical solutions. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. A distributed radar, comprising a controller, a receive antenna, and N transmit antennas, wherein N is an integer greater than or equal to 3;
   the N transmit antennas comprise a first transmit antenna, a second transmit antenna, and a third transmit antenna, and a distance between the first transmit antenna and the controller is shorter than a distance between any of the other transmit antennas in the N transmit antennas and the controller;
   a distance between the first transmit antenna and the second transmit antenna is a first distance, a distance between the first transmit antenna and the third transmit antenna is a second distance, and the first distance is shorter than the second distance; and
   the second transmit antenna is connected to the controller by using a first cable, the third transmit antenna is connected to the controller by using a second cable, a ratio of the first distance to the second distance is a first ratio, a ratio of a length of the first cable to a length of the second cable is a second ratio, and the second ratio is greater than the first ratio.

2. The distributed radar according to claim 1, wherein the second ratio is greater than 1.5 times the first ratio, and the second ratio is less than 10 times a reciprocal of the first ratio.

3. The distributed radar according to claim 1, wherein the length of the first cable is greater than the length of the second cable.

4. The distributed radar according to claim 1, wherein the N transmit antennas further comprise a fourth transmit antenna, a distance between the first transmit antenna and the fourth transmit antenna is a third distance, and the second distance is shorter than the third distance; and
   the fourth transmit antenna is connected to the controller by using a third cable, a ratio of the first distance to the third distance is a third ratio, a ratio of the length of the first cable to a length of the third cable is a fourth ratio, and the fourth ratio is greater than the third ratio.

5. The distributed radar according to claim 1, wherein the receive antenna, the first transmit antenna, and the controller are integrated.

6. The distributed radar according to claim 1, wherein the first cable and the second cable are terahertz active cables (TACs).

7. The distributed radar according to claim 1, wherein the controller comprises a signal source, a signal separator, and at least one processor;
   the signal source is configured to:
   send a first signal at a first frequency, a second signal at a second frequency, a third signal at the first frequency, a fourth signal at the second frequency, a fifth signal at the first frequency, and a sixth signal at the second frequency to the signal separator and the at least one processor;
   the signal separator is configured to:
   send the first signal and the second signal to the first transmit antenna, send the third signal and the fourth signal to the second transmit antenna, and send the fifth signal and the sixth signal to the third transmit antenna; and
   the at least one processor is configured to:
   obtain, from the receive antenna, an echo signal corresponding to each transmitted signal;
   calculate a phase difference corresponding to a transmit/receive delay between each transmitted signal and its corresponding echo signal, to obtain a phase difference set comprising the phase difference corresponding to the transmit/receive delay between each transmitted signal and its corresponding echo signal; and
   calculate, based on the obtained phase difference set, a first delay of signal transmission through the first cable and a second delay of signal transmission through the second cable.

8. The distributed radar according to claim 1, wherein the controller is configured to:
   control the first transmit antenna to transmit a first signal at a first frequency and a second signal at a second frequency, control the second transmit antenna to transmit a third signal at the first frequency and a fourth signal at the second frequency, and control the third transmit antenna to transmit a fifth signal at the first frequency and a sixth signal at the second frequency;
   receive, by using the receive antenna, an echo signal corresponding to each transmitted signal;
   calculate a phase difference corresponding to a transmit/receive delay between each transmitted signal and its corresponding echo signal, to obtain a phase difference set comprising the phase difference corresponding to the transmit/receive delay between each transmitted signal and its corresponding echo signal; and
   calculate, based on the obtained phase difference set, a first delay of signal transmission through the first cable and a second delay of signal transmission through the second cable.

9. The distributed radar according to claim 8, wherein the first cable and the second cable are terahertz active cables (TACs), and the controller is further configured to:
control the first transmit antenna to transmit a seventh signal at a third frequency, control the second transmit antenna to transmit an eighth signal at the third frequency, and control the third transmit antenna to transmit a ninth signal at the third frequency;
receive, by using the receive antenna, a seventh echo signal of the seventh signal, an eighth echo signal of the eighth signal, and a ninth echo signal of the ninth signal; and
calculate a seventh phase difference corresponding to a transmit/receive delay between the seventh signal and the seventh echo signal, an eighth phase difference corresponding to a transmit/receive delay between the eighth signal and the eighth echo signal, and a ninth phase difference corresponding to a transmit/receive delay between the ninth signal and the ninth echo signal; and
the controller is further configured to:
calculate, based on the phase difference set, the seventh phase difference, the eighth phase difference, and the ninth phase difference, a first sweep slope variation of signal transmission through the first cable and a second sweep slope variation of signal transmission through the second cable.

10. The distributed radar according to claim 8, wherein the control controller is further configured to:
generate a first probing signal and a second probing signal;
perform delay compensation on the first probing signal based on the first delay to obtain a first transmit moment, and perform delay compensation on the second probing signal based on the second delay to obtain a second transmit moment; and
control the second transmit antenna to transmit the first probing signal at the first transmit moment, and control the third transmit antenna to transmit the second probing signal at the second transmit moment.

11. The distributed radar according to claim 8, wherein the controller is further configured to:
control the second transmit antenna to transmit a first probing signal, and control the third transmit antenna to transmit a second probing signal;
receive, by using the receive antenna, a first probing echo signal of the first probing signal and a second probing echo signal of the second probing signal; and
perform delay compensation on the first probing echo signal based on the first delay, and perform delay compensation on the second probing echo signal based on the second delay.

12. The distributed radar according to claim 8, wherein the signals transmitted by the N transmit antennas are sine wave signals or narrowband amplitude modulation signals.

13. A distributed radar, comprising a controller, a transmit antenna, and N receive antennas, and wherein N is an integer greater than or equal to 3;
the N receive antennas comprise a first receive antenna, a second receive antenna, and a third receive antenna, and a distance between the first receive antenna and the controller is shorter than a distance between any of the other receive antennas in the N receive antennas and the controller;
a distance between the first receive antenna and the second receive antenna is a first distance, a distance between the first receive antenna and the third receive antenna is a second distance, and the first distance is shorter than the second distance; and
the second receive antenna is connected to the controller by using a first cable, the third receive antenna is connected to the controller by using a second cable, a ratio of the first distance to the second distance is a first ratio, a ratio of a length of the first cable to a length of the second cable is a second ratio, and the second ratio is greater than the first ratio.

14. The distributed radar according to claim 13, wherein the second ratio is greater than 1.5 times the first ratio, and the second ratio is less than 10 times a reciprocal of the first ratio.

15. The distributed radar according to claim 13, wherein the length of the first cable is greater than the length of the second cable.

16. The distributed radar according to claim 13, wherein the N receive antennas further comprise a fourth receive antenna, a distance between the first receive antenna and the fourth receive antenna is a third distance, and the second distance is shorter than the third distance; and
the fourth receive antenna is connected to the controller by using a third cable, a ratio of the first distance to the third distance is a third ratio, a ratio of the length of the first cable to a length of the third cable is a fourth ratio, and the fourth ratio is greater than the third ratio.

17. The distributed radar according to claim 13, wherein the controller comprises a signal source, a signal selector, and at least one processor;
the signal source is configured to:
send a first signal at a first frequency and a second signal at a second frequency to the transmit antenna and the at least one processor;
the signal selector is configured to:
obtain, from the first receive antenna, the second receive antenna, and the third receive antenna, an echo signal corresponding to each transmitted signal, and send each echo signal to the at least one processor; and
the at least one processor is configured to:
calculate a phase difference corresponding to a transmit/receive delay between each transmitted signal and its corresponding echo signal, to obtain a phase difference set comprising the phase difference corresponding to the transmit/receive delay between each transmitted signal and its corresponding echo signal; and
calculate, based on the obtained phase difference set, a first delay of signal transmission through the first cable and a second delay of signal transmission through the second cable.

18. The distributed radar according to claim 13, wherein the controller is configured to:
control the transmit antenna to transmit a first signal at a first frequency and a second signal at a second frequency;
receive, by using the first receive antenna, the second receive antenna, and the third receive antenna, an echo signal corresponding to each transmitted signal;
calculate a phase difference corresponding to a transmit/receive delay between each transmitted signal and its corresponding echo signal, to obtain a phase difference set comprising the phase difference corresponding to the transmit/receive delay between each transmitted signal and its corresponding echo signal; and
calculate, based on the obtained phase difference set, a first delay of signal transmission through the first cable and a second delay of signal transmission through the second cable.

19. The distributed radar according to claim 18, wherein the first cable and the second cable are TACs, and the controller is further configured to:

control the transmit antenna to transmit a third signal at a third frequency;

receive a seventh echo signal of the third signal by using the first receive antenna, receive an eighth echo signal of the third signal by using the second receive antenna, and receive a ninth echo signal of the third signal by using the third receive antenna; and calculate a seventh phase difference corresponding to a transmit/receive delay between the third signal and the seventh echo signal, an eighth phase difference corresponding to a transmit/receive delay between the third signal and the eighth echo signal, and a ninth phase difference corresponding to a transmit/receive delay between the third signal and the ninth echo signal; and the controller is further configured to:

calculate, based on the phase difference set, the seventh phase difference, the eighth phase difference, and the ninth phase difference, a first sweep slope variation of signal transmission through the first cable and a second sweep slope variation of signal transmission through the second cable.

20. The distributed radar according to claim 19, wherein the controller is further configured to:

control the transmit antenna to transmit a probing signal;

receive a first probing echo signal of the probing signal by using the second receive antenna, and receive a second probing echo signal of the probing signal by using the third receive antenna; and perform delay compensation on the first probing echo signal based on the first delay, and perform delay compensation on the second probing echo signal based on the second delay.

* * * * *

UNITED STATES PATENT AND TRADEMARK OFFICE
CERTIFICATE OF CORRECTION

PATENT NO. : 12,474,445 B2
APPLICATION NO. : 18/158516
DATED : November 18, 2025
INVENTOR(S) : Rui Lyu Page 1 of 1

It is certified that error appears in the above-identified patent and that said Letters Patent is hereby corrected as shown below:

In the Specification

Column 12, Line 41, change "MHZ" to -- MHz --;

In the Claims

Column 25, Claim 10, Line 29, change "control controller" to -- controller --; and Column 25, Claim 13, Line 57, change "and wherein" to --wherein --.

Signed and Sealed this
Twenty-third Day of December, 2025

John A. Squires
*Director of the United States Patent and Trademark Office*